(12) United States Patent
Kondoh et al.

(10) Patent No.: US 11,085,773 B2
(45) Date of Patent: Aug. 10, 2021

(54) ANGULAR VELOCITY SENSOR CORRECTION DEVICE AND METHOD FOR CORRECTING OUTPUT SIGNAL FROM ANGULAR VELOCITY SENSOR, AND DIRECTION ESTIMATION DEVICE AND METHOD FOR ESTIMATING DIRECTION BY CORRECTING OUTPUT SIGNAL FROM ANGULAR VELOCITY SENSOR

(71) Applicant: JVC KENWOOD Corporation, Yokohama (JP)

(72) Inventors: Takahiro Kondoh, Yokohama (JP); Seiichi Sugiyama, Yokohama (JP); Hidenori Fukushima, Yokohama (JP)

(73) Assignee: JVC KENWOOD CORPORATION, Yokohama (JP)

(*) Notice: Subject to any disclaimer, the term of this patent is extended or adjusted under 35 U.S.C. 154(b) by 599 days.

(21) Appl. No.: 15/411,289

(22) Filed: Jan. 20, 2017

(65) Prior Publication Data

US 2017/0131107 A1 May 11, 2017

Related U.S. Application Data

(63) Continuation of application No. PCT/JP2015/084809, filed on Dec. 11, 2015.

(30) Foreign Application Priority Data

Dec. 16, 2014 (JP) ............................. JP2014-254267
Dec. 16, 2014 (JP) ............................. JP2014-254268
Dec. 16, 2014 (JP) ............................. JP2014-254269

(51) Int. Cl.
*G01C 21/28* (2006.01)
*G01C 25/00* (2006.01)
(Continued)

(52) U.S. Cl.
CPC ............. *G01C 21/28* (2013.01); *G01C 19/00* (2013.01); *G01C 21/165* (2013.01);
(Continued)

(58) Field of Classification Search
None
See application file for complete search history.

(56) References Cited

U.S. PATENT DOCUMENTS 5,424,953 A * 6/1995 Masumoto .............. G01C 21/28
340/988
2004/0204798 A1 * 10/2004 Imada ..................... G01C 21/28
701/1

(Continued)

FOREIGN PATENT DOCUMENTS

JP        2001-330454 A      11/2001
JP        2012-103023 A       5/2012

*Primary Examiner* — Alexander Satanovsky
*Assistant Examiner* — Brent A. Fairbanks
(74) *Attorney, Agent, or Firm* — Brundidge & Stanger, P.C.

(57) ABSTRACT

A GPS positioning unit acquires GPS positioning data of an object positioned based on a signal from a GPS satellite, and an angular velocity sensor acquires an output signal of the object. A sensitivity coefficient calculation unit sequentially derives a temporary sensitivity coefficient of the angular velocity sensor based on the GPS positioning data and the output signal. The sensitivity coefficient calculation unit derives a sensitivity coefficient for correcting the angular velocity output from the angular velocity sensor, by performing statistical processing on the temporary sensitivity coefficient of the angular velocity sensor that has been sequentially derived. A correlation coefficient calculation unit derives a correlation coefficient based on the GPS positioning data and the output signal. The sensitivity coefficient calculation unit changes a forgetting coefficient to be (Continued)

used when the statistical processing is performed, in accordance with the correlation coefficient.

11 Claims, 16 Drawing Sheets

(51) Int. Cl.
  *G01C 21/16*  (2006.01)
  *G01S 19/39*  (2010.01)
  *G01C 19/00*  (2013.01)
  *G01S 19/47*  (2010.01)

(52) U.S. Cl.
  CPC .......... *G01C 25/005* (2013.01); *G01S 19/396* (2019.08); *G01S 19/47* (2013.01); *G01S 19/39* (2013.01)

(56) References Cited

U.S. PATENT DOCUMENTS

| | | | | |
|---|---|---|---|---|
| 2009/0267594 | A1* | 10/2009 | Kather | G01B 7/30 |
| | | | | 324/207.25 |
| 2010/0106445 | A1* | 4/2010 | Kondoh | G01C 21/28 |
| | | | | 702/96 |
| 2014/0324375 | A1* | 10/2014 | Seo | G01C 19/5726 |
| | | | | 702/104 |
| 2015/0377740 | A1* | 12/2015 | Park | G01M 17/02 |
| | | | | 702/33 |

* cited by examiner

FIG.4

| TRAVELING STATE | FORGETTING COEFFICIENT |
|---|---|
| STOPPED STATE | $\alpha 1$ |
| STRAIGHT TRAVELING STATE | $\alpha 1$ |
| NON-STRAIGHT TRAVELING STATE | $\alpha 2$ |

| TRAVELING STATE | CONDITION | FORGETTING COEFFICIENT |
|---|---|---|
| STOPPED STATE | – | $\alpha 1$ |
| STRAIGHT TRAVELING STATE | – | $\alpha 1$ |
| NON-STRAIGHT TRAVELING STATE | CORRELATION COEFFICIENT LARGER THAN OR EQUAL TO X | $\alpha 21$ |
| | CORRELATION COEFFICIENT SMALLER THAN X | $\alpha 22 (\alpha 22 < \alpha 21)$ |

FIG.16

| GPS EFFECTIVENESS | CORRELATION COEFFICIENT | |
|---|---|---|
| | LARGER THAN OR EQUAL TO C5 | SMALLER THAN C5 |
| HIGH | AMOUNT OF CHANGE IN GPS DIRECTION 100%, ANGULAR VELOCITY 0% | AMOUNT OF CHANGE IN GPS DIRECTION 50%, ANGULAR VELOCITY 50% |
| LOW | AMOUNT OF CHANGE IN GPS DIRECTION 80%, ANGULAR VELOCITY 20% | AMOUNT OF CHANGE IN GPS DIRECTION 30%, ANGULAR VELOCITY 70% |
| NOT INEFFECTIVE | AMOUNT OF CHANGE IN GPS DIRECTION 60%, ANGULAR VELOCITY 40% | AMOUNT OF CHANGE IN GPS DIRECTION 20%, ANGULAR VELOCITY 80% |
| INEFFECTIVE | — | AMOUNT OF CHANGE IN GPS DIRECTION 0%, ANGULAR VELOCITY 100% |

114

ANGULAR VELOCITY SENSOR CORRECTION DEVICE AND METHOD FOR CORRECTING OUTPUT SIGNAL FROM ANGULAR VELOCITY SENSOR, AND DIRECTION ESTIMATION DEVICE AND METHOD FOR ESTIMATING DIRECTION BY CORRECTING OUTPUT SIGNAL FROM ANGULAR VELOCITY SENSOR

CROSS-REFERENCE TO RELATED APPLICATION

This application is based upon and claims the benefit of priority from the Japanese Patent Application No. 2014-254267, filed on Dec. 16, 2014, Japanese Patent Application No. 2014-254268, filed on Dec. 16, 2014 and Japanese Patent Application No. 2014-254269, filed on Dec. 16, 2014, the entire contents of which are incorporated herein by reference.

BACKGROUND

1. Field

The present invention relates to an angular velocity sensor correction technique and a direction estimation technique, and in particular, to a device and method for correcting an angular velocity sensor that correct an output signal from an angular velocity sensor and to a device and method for estimating a direction that estimate a direction by correcting an output signal from an angular velocity sensor.

2. Description of the Related Art

In automobile navigation systems, an optimal position is generally estimated by combining a position calculated from self-contained navigation and that calculated from GPS (Global Positioning System). In the self-contained navigation, the current position is calculated by updating the previous positioned position based on a velocity pulse indicating the speed of a vehicle and the turning angular velocity of the vehicle measured by an angular velocity sensor. According to such a navigation system, the position of an own vehicle can be derived by the self-contained navigation even when the vehicle is in a tunnel, basement parking area, or canyon of skyscrapers where it is difficult to receive radio waves from a GPS satellite. An angular velocity $\bar{\omega}$ occurring when a vehicle is turning is derived by the following Equation:

$$\bar{\omega} = (V\text{out} - V\text{offset})/(S \cdot \cos \alpha) \quad (1)$$

wherein Vout is the output voltage of an angular velocity sensor, Voffset the offset value thereof, S (mV/deg/sec) the sensitivity coefficient thereof, and α (deg) the inclination of the detection axis thereof with respect to the vertical axis.

In order to accurately determine angular velocity, it is necessary to accurately determine the offset value and sensitivity coefficient of an angular velocity sensor. The sensitivity coefficient of an angular velocity sensor is generally varied by an influence of the individual difference or aging deterioration of an angular velocity sensor. The offset value may be changed due to a change in temperature. That is, the offset value is affected by an increase in temperature caused by the generated heat of a substrate, etc., used in an automobile navigation system, or caused by that of a vehicle engine, etc., occurring when an automobile navigation system is attached to the dashboard, etc., of a vehicle. Conventionally, the offset value of an angular velocity sensor has been corrected by using an output voltage from the angular velocity sensor, occurring when a vehicle is stopped or traveling straight, i.e., when angular velocity is "0." However, in the case where a vehicle is not stopped frequently, i.e., when a vehicle is traveling on an expressway, or when it is traveling in an area with little traffic for a long time, it becomes difficult to regularly correct the offset value of an angular velocity sensor, whereby the accuracy of the offset value is likely to be decreased. Because even the correction of the offset value occurring when a vehicle is traveling straight, in which the output voltage from an angular velocity sensor tends to become accurately "0", is likely to be dependent on the shape of a road or a driving situation of a driver, it is difficult to regularly perform the correction. The sensitivity coefficient of an angular velocity sensor is derived from an amount of change in direction during unit period and the output voltage of the angular velocity sensor. Accordingly, the sensitivity coefficient of an angular velocity sensor is affected by an influence of an error in an offset value, as clear from Equation (1).

There is proposed a technique for correcting the offset and sensitivity coefficient of an angular velocity sensor even when a vehicle is traveling in directions other than straight. In the technique, the offset value and sensitivity coefficient of an angular velocity sensor are corrected based on the average value of the output voltages of the angular velocity sensor during a predetermined period and an amount of change in direction of a vehicle during a period when the average value is calculated. Specifically, the offset value Voffset of an angular velocity sensor is derived as follows:

$$V\text{offset} = 1/n * \Sigma V\text{out} - 1/\Delta t * \Delta \theta / n * S * \cos \alpha \quad (2)$$

wherein n is the number of samples of the output voltage of an angular velocity sensor, Δt (sec) a sampling interval, Δθ (deg) an amount of change in direction, and α the inclination of the detection axis of the angular velocity sensor with respect to the vertical axis. The amount of change in direction is determined based on a GPS direction acquired from a GPS satellite or on map data. The inclination of the detection axis of an angular velocity sensor with respect to the vertical axis is determined by adding the mounting angle of the angular velocity sensor to the tilt angle of a road. The mounting angle of an angular velocity sensor is determined from an acceleration sensor, and the tilt angle of a road is determined from an amount of change in GPS altitude, etc., acquired from a GPS satellite. The sensitivity coefficient of an angular velocity sensor is derived, in a state where an amount of change in the corrected offset value is small, i.e., in a stable state, as follows:

$$S = (1/n * \Sigma V\text{out} - V\text{offset}) * n/\Delta \theta * \Delta t / \cos \alpha \quad (3)$$

wherein Voffset is said to be known and a constant in a stable state where an amount of change in the corrected offset value is small (see e.g., Patent Document 1).

RELATED ART DOCUMENT

Patent Document

[Patent Document 1] Japanese Patent Application Publication No. 2001-330454

Under these situations, in order to improve the accuracy of estimating a position by an automobile navigation system, it is desirable to highly accurately correct an output signal of an angular velocity sensor.

SUMMARY

In order to solve the aforementioned problem, an angular velocity sensor correction device according to an aspect of the present embodiment comprises: an acquisition unit that acquires both positioning data of an object positioned based on a signal from a GPS satellite and angular velocity of the object output from an angular velocity sensor; a sensitivity coefficient derivation unit that sequentially derives a temporary sensitivity coefficient of the angular velocity sensor, based on the positioning data and the angular velocity that have been acquired in the acquisition unit; a sensitivity coefficient filtering unit that derives a sensitivity coefficient of the angular velocity sensor for correcting the angular velocity output from the angular velocity sensor, by performing statistical processing on the temporary sensitivity coefficient of the angular velocity sensor sequentially derived in the sensitivity coefficient derivation unit; and a correlation coefficient derivation unit that derives a correlation coefficient based on the positioning data and the angular velocity that have been acquired in the acquisition unit. The sensitivity coefficient filtering unit changes a forgetting coefficient to be used when the statistical processing is performed, in accordance with the correlation coefficient derived in the correlation coefficient derivation unit.

Another aspect of the present embodiment is also an angular velocity sensor correction device. The device comprises: an acquisition unit that acquires both positioning data of an object positioned based on a signal from a GPS satellite and angular velocity of the object output from an angular velocity sensor; an offset value derivation unit that sequentially derives a temporary offset value of the angular velocity sensor, based on the positioning data and the angular velocity that have been acquired in the acquisition unit; an offset value filtering unit that derives an offset value of the angular velocity sensor for correcting the angular velocity output from the angular velocity sensor, by performing statistical processing on the temporary offset value of the angular velocity sensor sequentially derived in the offset value derivation unit; and a correlation coefficient derivation unit that derives a correlation coefficient based on the positioning data and the angular velocity that have been acquired in the acquisition unit. The offset value filtering unit changes a forgetting coefficient to be used when the statistical processing is performed, in accordance with the correlation coefficient derived in the correlation coefficient derivation unit.

Still another aspect of the present embodiment is an angular velocity sensor correction method. The method comprises the steps of: acquiring both positioning data of an object positioned based on a signal from a GPS satellite and angular velocity of the object output from an angular velocity sensor; sequentially deriving a temporary sensitivity coefficient of the angular velocity sensor based on the positioning data and the angular velocity that have been acquired; deriving a sensitivity coefficient of the angular velocity sensor for correcting the angular velocity output from the angular velocity sensor, by performing statistical processing on the temporary sensitivity coefficient of the angular velocity sensor that has been sequentially derived; and deriving a correlation coefficient based on the positioning data and the angular velocity that have been acquired. The deriving a sensitivity coefficient of the angular velocity sensor changes a forgetting coefficient to be used when the statistical processing is performed, in accordance with the derived correlation coefficient.

Still another aspect of the present embodiment is also an angular velocity sensor correction method. The method comprises the steps of: acquiring both positioning data of an object positioned based on a signal from a GPS satellite and angular velocity of the object output from an angular velocity sensor; sequentially deriving a temporary offset value of the angular velocity sensor based on the positioning data and the angular velocity that have been acquired; deriving an offset value of the angular velocity sensor for correcting the angular velocity output from the angular velocity sensor, by performing statistical processing on the temporary offset value of the angular velocity sensor that has been sequentially derived; and deriving a correlation coefficient based on the positioning data and the angular velocity that have been acquired. The deriving an offset value of the angular velocity sensor changes a forgetting coefficient to be used when the statistical processing is performed, in accordance with the derived correlation coefficient.

Still another aspect of the present embodiment is a direction estimation device. This device comprises: an acquisition unit that acquires both positioning data of an object positioned based on a signal from a GPS satellite and angular velocity of the object output from an angular velocity sensor; a sensitivity coefficient calculation unit that derives a sensitivity coefficient of the angular velocity sensor based on the positioning data and the angular velocity that have been acquired in the acquisition unit; an offset value calculation unit that derives an offset value of the angular velocity sensor based on the positioning data and the angular velocity that have been acquired in the acquisition unit; an angular velocity conversion unit that corrects the angular velocity acquired in the acquisition unit, based on both the offset value of the angular velocity sensor derived in the offset value calculation unit and the sensitivity coefficient of the angular velocity sensor derived in the sensitivity coefficient calculation unit; a correlation coefficient derivation unit that derives a correlation coefficient based on the positioning data and the angular velocity that have been acquired in the acquisition unit; a determination unit that determines a ratio to be used when an amount of change in direction angle included in the positioning data acquired in the acquisition unit is combined with the angular velocity corrected in the angular velocity conversion unit, based on the correlation coefficient derived in the correlation coefficient derivation unit and effectiveness of the positioning data acquired in the acquisition unit; and an updating unit that combines, at the ratio determined in the determination unit, the amount of change in direction angle included in the positioning data acquired in the acquisition unit with the angular velocity corrected in the angular velocity conversion unit to update a direction by a combined value.

Still another aspect of the present embodiment is a direction estimation method. The method comprises the steps of: acquiring both positioning data of an object positioned based on a signal from a GPS satellite and angular velocity of the object output from an angular velocity sensor; deriving a sensitivity coefficient of the angular velocity sensor based on the positioning data and the angular velocity that have been acquired; deriving an offset value of the angular velocity sensor based on the positioning data and the angular velocity that have been acquired; correcting the acquired angular velocity based on the offset value of the angular velocity sensor and the sensitivity coefficient of the derived angular velocity sensor that have been derived; deriving a correlation coefficient based on the positioning data and the angular velocity that have been acquired; determining a ratio to be used when the amount of change in direction angle included in the acquired positioning data with the corrected angular velocity, based on the derived correlation coefficient and effectiveness of the acquired positioning data; and combining, at the determined ratio, the amount of change in direction angle included in the acquired positioning data with the corrected angular velocity to update a direction by a combined value.

It is to be noted that any arbitrary combination of the aforementioned structural components or rearrangement in the form among a method, an apparatus, a system, a recording medium, a computer program and so forth are all effective as and encompassed by the present embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is a view illustrating a data structure of a table stored in a forgetting coefficient control unit in FIG. 3;

FIG. 12 is a view illustrating a data structure of a table stored in a forgetting coefficient control unit in FIG. 11;

FIG. 16 is a view illustrating a data structure of a table stored in a combination ratio determination unit in FIG. 14.

DETAILED DESCRIPTION

Figure 1:
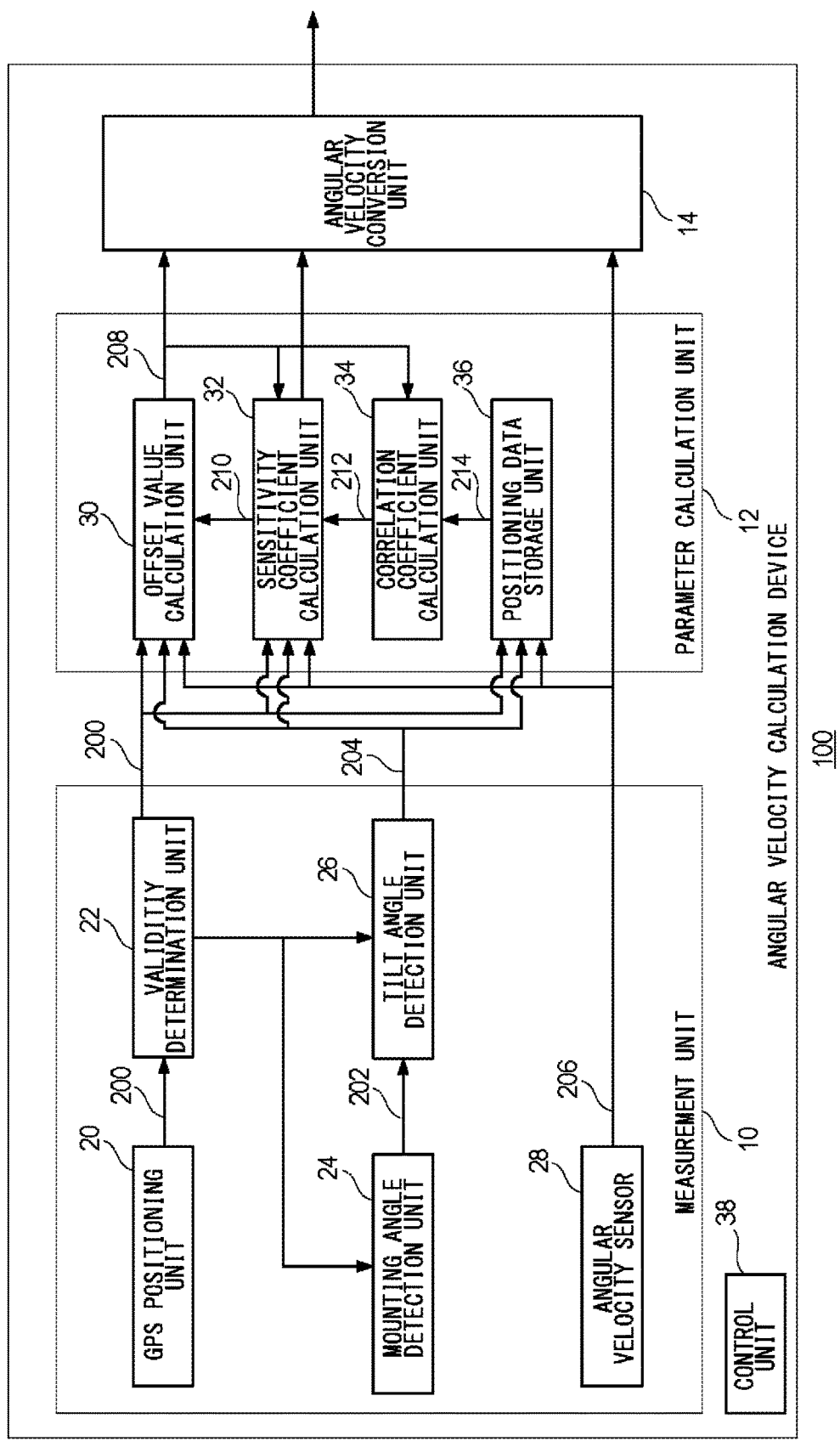
FIG. 1 is a view illustrating a configuration of an angular velocity calculation device according to Embodiment 1.

The invention will now be described by reference to the preferred embodiments. This does not intend to limit the scope of the present invention, but to exemplify the invention.

Embodiment 1

Prior to the specific description of the present invention, the outline thereof will be given first. The present embodiment relates to an angular velocity calculation device that is installed in a vehicle, etc., for deriving angular velocity occurring when the vehicle is turning. The angular velocity calculation device derives angular velocity by using an offset value and a sensitivity coefficient for an output voltage from an angular velocity sensor. In Equation (3) for deriving the sensitivity coefficient of an angular velocity sensor, Voffset is not stabilized by an influence of a change in temperature, etc., and hence when the number of samples is increased, an error in the sensitivity coefficient may be increased. Also, in Equation (3) for deriving the sensitivity coefficient of an angular velocity sensor, when an amount of change in direction $\Delta\theta$ is determined from the GPS direction acquired from a GPS satellite, the accuracy of the GPS direction may be decreased depending on a situation where a radio wave from the GPS satellite is received, whereby an error included in the sensitivity coefficient becomes large.

Also in Equation (3), when the amount of change in direction $\Delta\theta$ is determined based on map data, the direction of a road based on the map data does not always and completely match the direction of travel of a vehicle, whereby an error included in the sensitivity coefficient may become large. Further, in Equation (3) for deriving the sensitivity coefficient of an angular velocity sensor, when the tilt angle of a road, included in the inclination of the detection axis of the angular velocity sensor with respect to the vertical axis, is determined from the amount of change in GPS altitude acquired from a GPS satellite, the accuracy of a GPS direction may be decreased depending on a situation where a radio wave from the GPS satellite is received, whereby an error included in the sensitivity coefficient becomes large.

In these cases, the error included in the sensitivity coefficient is required to be reduced in order to improve the accuracy of deriving angular velocity. Accordingly, when weighted averaging is performed on the previous value and the current value of the sequentially derived sensitivity of an angular velocity sensor, the angular velocity calculation device according to the present embodiment uses a forgetting coefficient while changing it. Specifically, the angular velocity calculation device calculates a correlation coefficient between a change in direction calculated from an angular velocity sensor and that calculated from GPS, both the changes having occurred during a predetermined period, and then changes a forgetting coefficient based on the correlation coefficient. As the correlation coefficient becomes larger, changes in direction calculated from different means including an angular velocity sensor and GPS become closer to each other, which leads to high accuracy of measuring a change in direction. Accordingly, in such a case, weighted averaging is performing, in which the influence of the current value of the sensitivity of an angular velocity sensor is increased. On the other hand, when the correlation coefficient becomes small, the accuracy of measuring a change in direction is deceased, and hence weighted averaging is performed, in which the influence of the current value of the sensitivity of an angular velocity sensor is reduced.

FIG. 1 illustrates a configuration of an angular velocity calculation device 100 according to Embodiment 1. The angular velocity calculation device 100 includes a measurement unit 10, a parameter calculation unit 12, an angular velocity conversion unit 14, and a control unit 38. The measurement unit includes a GPS positioning unit 20, a validity determination unit 22, amounting angle detection unit 24, a tilt angle detection unit 26, and an angular velocity sensor 28; and the parameter calculation unit 12 includes an offset value calculation unit 30, a sensitivity coefficient calculation unit 32, a correlation coefficient calculation unit 34, and a positioning data storage unit 36. Signals include GPS positioning data 200, a mounting angle 202, a tilt angle 204, an output signal 206, an offset value 208, a sensitivity coefficient 210, a correlation coefficient 212, and stored data 214. The angular velocity calculation device 100 is installed in a vehicle so as to be inclined at a predetermined mounting angle.

The GPS positioning unit 20 receives a signal from a non-illustrated GPS satellite to calculate the GPS positioning data 200. The GPS positioning data 200 includes longitude and latitude, a GPS altitude that represents the altitude of a vehicle, GPS speed that represents traveling speed, a GPS direction that represents the direction of a vehicle, PDOP (Position Dilution Precision), the number of captured satellites, and the like. Herein, PDOP is an index indicating, in the GPS positioning data 200, how an error in the position of a GPS satellite is reflected on the position of a receiving point, and it corresponds to a positioning error. The GPS positioning data 200 may include values other than these. Because the calculation of the GPS positioning data 200 has only to be performed by a publicly known technique, description thereof will be omitted herein. The GPS positioning unit 20 calculates the GPS positioning data 200 for each sampling interval, i.e., periodically. The GPS positioning unit 20 sequentially outputs the GPS positioning data 200 to the validity determination unit 22.

The validity determination unit 22 sequentially inputs the GPS positioning data 200 from the GPS positioning unit 20. The validity determination unit 22 determines whether each of the GPS positioning data 200 is valid. For example when the value of PDOP is smaller than or equal to a first threshold value and the GPS speed is higher than or equal to a second threshold value, the validity determination unit 22 determines that the GPS direction corresponding to them is valid. Conversely, when the aforementioned conditions are not satisfied, the validity determination unit 22 determines that the GPS direction corresponding to them is invalid. This is because when the value of PDOP is large or when the GPS speed is low, the accuracy of a GPS direction generally tends to be decreased. More specifically, when the value of PDOP is 6 or less and the GPS speed is 20 km/h or higher, the validity determination unit 22 represents the validity of a GPS direction with a flag.

When GPS speed is higher than or equal to a third threshold value, the validity determination unit 22 determines that the GPS speed is valid. Herein, the third threshold value may be equal to the second threshold value. Further, when a difference between GPS altitudes during a predetermined period is smaller than or equal to a fourth threshold value, the validity determination unit 22 determines that the GPS altitude is valid. As a result of such processing, the validity determination unit 22 adds a flag, indicating that a value is valid or invalid, to each of the values included in the GPS positioning data 200, such as a GPS direction (hereinafter, the GPS positioning data 200 to which the flag has been added is also referred to as the "GPS positioning data 200"). The validity determination unit 22 sequentially outputs the GPS positioning data 200 to the mounting angle detection unit 24, the tilt angle detection unit 26, the offset value calculation unit 30, the sensitivity coefficient calculation unit 32, and the positioning data storage unit 36.

The mounting angle detection unit 24 is, for example, a non-illustrated acceleration sensor, or the like, and sequentially inputs the GPS positioning data 200 from the validity determination unit 22 such that the inclination of the detection axis of the angular velocity sensor with respect to the vertical axis, occurring when a vehicle is in a horizontal state, is calculated as the mounting angle 202. When a change in the GPS altitude in the input GPS positioning data 200 is small, the mounting angle detection unit 24 determines that a vehicle is a horizontal state, and then calculates the mounting angle 202 based on the acceleration detected when the vehicle starts moving from a stopped state. Because a publicly known technique has only to be used in an acceleration sensor device, description thereof will be omitted herein. The mounting angle detection unit 24 outputs the detected mounting angle 202 to the tilt angle detection unit 26.

The tilt angle detection unit 26 sequentially inputs both the GPS positioning data 200 from the validity determination unit 22, in particular, the GPS altitude included in the GPS positioning data 200, and the mounting angle 202 from the mounting angle detection unit 24. The tilt angle detection unit 26 detects an average tilt angle of a vehicle (hereinafter, referred to as the "tilt angle 204") during a sampling interval, based on the sequentially input GPS altitude. Specifically, the tilt angle detection unit 26 sequentially calculates differences between the consecutive GPS altitudes to average the calculation results, and then derives the tilt angle of a vehicle by dividing the average value by the sampling interval. Herein, the interval between the consecutive GPS altitudes corresponds to the sampling interval. The tilt angle detection unit 26 adds the mounting angle 202 to the calculated tilt angle of a vehicle, and sequentially outputs, as the tilt angle 204, to the offset value calculation unit 30, the sensitivity coefficient calculation unit 32, and the positioning data storage unit 36.

The angular velocity sensor 28 corresponds, for example, to a gyro device, such as a vibrating gyroscope, and detects a change in the travelling direction of a vehicle as a relative angular change. That is, the angular velocity sensor 28 detects the turning angular velocity of a vehicle. The detected angular velocity is output, for example, as an analog signal of 0 V to 5 V. In that case, positive angular velocity corresponding to clockwise turning is output as a deviation voltage of 2.5 V to 5 V, while negative angular velocity corresponding to counterclockwise turning is output as a deviation voltage of 0 V to 2.5 V. 2.5 V is the offset value of angular velocity, i.e., a zero point, and is changed by an influence of temperature, etc.

A sensitivity coefficient (mV/deg/sec), indicating how the angular velocity is deviated from 2.5 V, is defined as a predetermined value that falls, in a horizontal state, within an acceptable error range. This acceptable error is caused by an influence of the individual difference of a gyro device, change over the years, temperature, or the like. By a non-illustrated AD (Analog to Digital) converter, the voltage of a gyro device is AD-converted, for example, at a sampling interval of 100 msec, and as a result a digital signal is output. The digital signal corresponds to the aforementioned output voltage, and hereinafter the term: output signal 206 is used. Because a publicly known technique has only to be used as the gyro device, description thereof will be omitted herein. The angular velocity sensor 28 outputs the output signal 206 to the offset value calculation unit 30, the sensitivity coefficient calculation unit 32, the positioning data storage unit 36, and the angular velocity conversion unit 14.

The offset value calculation unit 30 inputs the GPS positioning data 200 from the validity determination unit 22, the tilt angle 204 from the tilt angle detection unit 26, and the output signal 206 from the angular velocity sensor 28. The offset value calculation unit 30 also inputs the sensitivity coefficient 210 from the sensitivity coefficient calculation unit 32. The offset value calculation unit 30 calculates the offset value of the angular velocity sensor 28 (hereinafter, referred to as the "offset value 208") based on the GPS positioning data 200, the tilt angle 204, the output signal 206, and the sensitivity coefficient 210. The details of the processing in the offset value calculation unit 30 will be described later. The offset value calculation unit 30 outputs the offset value 208 to the angular velocity conversion unit 14, the sensitivity coefficient calculation unit 32, and the correlation coefficient calculation unit 34.

The sensitivity coefficient calculation unit 32 inputs the GPS positioning data 200 from the validity determination unit 22, the tilt angle 204 from the tilt angle detection unit 26, and the output signal 206 from the angular velocity sensor 28. The sensitivity coefficient calculation unit 32 also inputs the offset value 208 from the offset value calculation unit 30 and the correlation coefficient 212 from the correlation coefficient calculation unit 34. The sensitivity coefficient calculation unit 32 calculates the sensitivity coefficient of the angular velocity sensor 28 (hereinafter, referred to as the aforementioned "sensitivity coefficient 210") based on the GPS positioning data 200, the output signals 206, the tilt angles 204, and the offset values 208, which have been input during a predetermined period, for example, during 10 seconds. The details of the processing in the sensitivity coefficient calculation unit 32, in particular, the details of the processing using the correlation coefficient 212 will be described later. The sensitivity coefficient calculation unit 32 outputs the sensitivity coefficient 210 to the angular velocity conversion unit 14 and the offset value calculation unit 30.

The positioning data storage unit 36 is formed by a ring buffer on a memory, etc., and sequentially inputs the GPS positioning data 200 from the validity determination unit 22, the tilt angle 204 from the tilt angle detection unit 26, and the output signal 206 from the angular velocity sensor 28. The positioning data storage unit 36 acquires the GPS positioning data 200 that has been determined as valid in the validity determination unit 22, and stores, as the stored data 214, the GPS positioning data 200, the tilt angle 204, and the output signal 206, which are consecutively valid during a predetermined period, e.g., during a period when the sensitivity coefficient calculation unit 32 calculates the sensitivity coefficient 210, and makes the validity flag of the stored data valid. Whenever valid GPS positioning data is input, the positioning data storage unit 36 updates the stored data 214. When the input GPS positioning data 200 is invalid, the positioning data storage unit 36 clears the stored data 214 and makes the validity flag invalid. The positioning data storage unit 36 adds the validity flag to the stored data 214 that has been stored, and outputs to the correlation coefficient calculation unit 34.

The correlation coefficient calculation unit 34 sequentially inputs the offset value 208 from the offset value calculation unit 30 and the stored data 214 from the positioning data storage unit 36. When the validity flag added to the stored data 214 is valid, the correlation coefficient calculation unit 34 calculates, during a predetermined period, e.g., during a period when the sensitivity coefficient calculation unit 32 calculates the sensitivity coefficient 210, the correlation coefficient 212 between: a value obtained by dividing the difference, between the integrated value of the output signal 206 and the offset value 208, by the cosine value of the tilt angle 204; and the amount of change in GPS direction included in the GPS positioning data 200. The details of the processing in the correlation coefficient calculation unit 34 will be described later. The correlation coefficient calculation unit 34 outputs the correlation coefficient 212 to the sensitivity coefficient calculation unit 32.

The angular velocity conversion unit 14 inputs the output signal 206 from the angular velocity sensor 28, the tilt angle 204 from the tilt angle detection unit 26, the offset value 208 from the offset value calculation unit 30, and the sensitivity coefficient 210 from the sensitivity coefficient calculation unit 32. The angular velocity conversion unit 14 calculates the angular velocity $\bar{\omega}$ of a vehicle by calculating the aforementioned Equation (1) based on the output signal 206, the tilt angle 204, the offset value 208, and the sensitivity coefficient 210. The control unit 38 controls the whole operations of the angular velocity calculation device 100.

This configuration is implemented in the hardware by any CPU of a computer, memory, and other LSI, and implemented in the software by a computer program or the like that is loaded in a memory. Herein, functional blocks implemented by the cooperation of hardware and software are depicted. Thus, it is to be understood by a person skilled in the art that these functional blocks can be implemented in various forms, namely, solely in hardware, solely in software, or through a combination of hardware and software.

Figure 2:
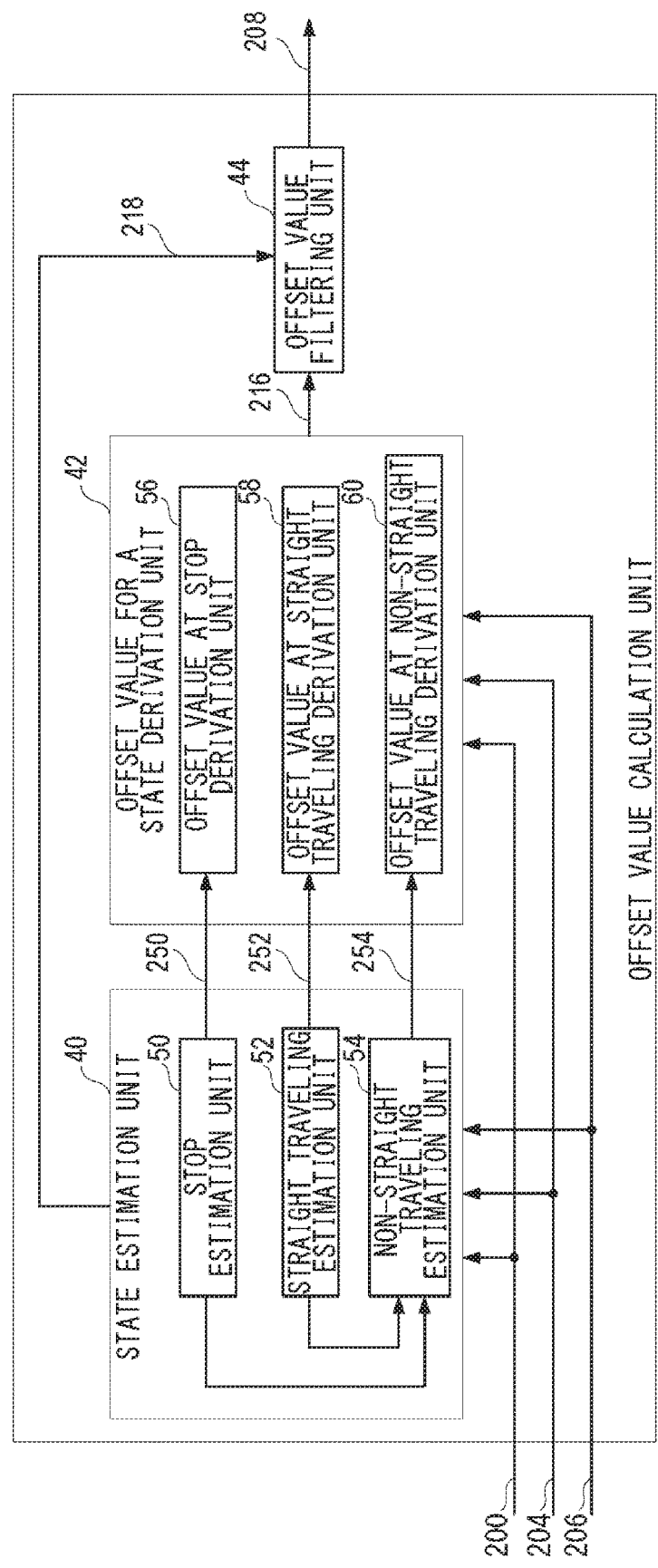
FIG. 2 is a view illustrating a configuration of an offset value calculation unit in FIG. 1.

FIG. 2 illustrates a configuration of the offset value calculation unit 30. The offset value calculation unit 30 includes a state estimation unit 40, an offset value for a state derivation unit 42, and an offset value filtering unit 44. The state estimation unit 40 includes a stop estimation unit 50, a straight traveling estimation unit 52, and a non-straight traveling estimation unit 54; and the offset value for a state derivation unit 42 includes an offset value at stop derivation unit 56, an offset value at straight traveling derivation unit 58, and an offset value at non-straight traveling derivation unit 60. Further, signals include a temporary offset value 216 and traveling state information 218.

The state estimation unit 40 inputs the GPS positioning data 200, the tilt angle 204, and the output signal 206. The state estimation unit 40 estimates the traveling state of a vehicle in the stop estimation unit 50, the straight traveling estimation unit 52, and the non-straight traveling estimation unit 54. Herein, it is estimated, as the traveling state of a vehicle, whether the vehicle is in a stopped state, in a straight traveling state, or in the remaining state, i.e., in a non-straight traveling state. The state estimation unit 40 outputs, as the traveling state information 218, a determination result to the offset value filtering unit 44.

The stop estimation unit 50 acquires the GPS positioning data 200 that has been determined as valid in the non-illustrated validity determination unit 22. The stop estimation unit 50 extracts GPS speed from the GPS positioning data 200 to confirm whether the GPS speed is "0." On the other hand, the stop estimation unit 50 calculates the variance value of the output signal 206 during a predetermined period to compare the variance value with a fifth threshold value. When the GPS speed is 0 and the variance value is smaller than the fifth threshold value, the stop estimation unit 50 determines that a vehicle is in a stopped state. As described above, there is the tendency that when the GPS speed is low, the accuracy is decreased; however, the stop estimation unit 50 determines that a vehicle is in a stopped state, by using the variance value of the output signal 206 in combination. Herein, the predetermined period is set, for example, to 1 sec that is the sampling interval of the GPS speed. When the variance value of the output signal 206 is small during the predetermined period, it is estimated that a vehicle is in a stable state where the vehicle is not swung, etc. When determining that a vehicle is not in a stopped state, the stop estimation unit 50 outputs the determination result to the non-straight traveling estimation unit 54.

The straight traveling estimation unit 52 acquires the GPS positioning data 200 that has been determined as valid in the non-illustrated validity determination unit 22. Also, the straight traveling estimation unit 52 extracts a GPS direction from the GPS positioning data 200 to derive an amount of change in the GPS direction over a predetermined period (hereinafter, referred to as an "amount of change in GPS direction"). The straight traveling estimation unit 52 further confirms whether the amount of change in GPS direction is "0." The straight traveling estimation unit 52 calculates the variance value of the output signal 206 during a predetermined period to compare the variance value with a sixth threshold value. The sixth threshold value may be equal to the fifth threshold value. Herein, the predetermined period is set, for example, to a period when the amount of change in GPS direction is consecutively 0.

When the amount of change in GPS direction is 0 and the variance value is smaller than the sixth threshold value, the straight traveling estimation unit 52 determines that a vehicle is in a straight traveling state. When the variance value of the output signal 206 is small during a predetermined period, it is estimated that a vehicle is in a straight traveling state without an influence of fine meandering, etc. Although depending on a driving situation of a driver or the shape of a road, a straight traveling state in, for example, an urban area, etc., is detected generally less frequently than a stopped state determined by the stop estimation unit 50, and the period thereof is for approximately several seconds. When determining that a vehicle is not in a straight traveling state, the straight traveling estimation unit 52 outputs the determination result to the non-straight traveling estimation unit 54. Herein, when the stop estimation unit 50 determines that a vehicle is in a stopped state and when the straight traveling estimation unit 52 determines that it is in a straight traveling state, priority is placed on the determination result by the stop estimation unit 50. When inputting, from the stop estimation unit 50, the fact that a vehicle is not in a stopped state and inputting, from the straight traveling estimation unit 52, the fact that it is not in a straight traveling state, the non-straight traveling estimation unit 54 determines that a vehicle is in a non-straight traveling state.

The offset value for a state derivation unit 42 inputs the GPS positioning data 200, the output signal 206, the tilt angle 204, and the sensitivity coefficient 210. The offset value for a state derivation unit 42 sequentially derives the temporary offset value 216 of the angular velocity sensor 28 in accordance with the traveling state of a vehicle estimated in the state estimation unit 40. When it is determined in the stop estimation unit 50 that a vehicle is in a stopped state, the offset value at stop derivation unit 56 sequentially derives the temporary offset value 216 based on the output signal 206. When it is determined in the straight traveling estimation unit 52 that a vehicle is in a straight traveling state, the offset value at straight traveling derivation unit 58 sequentially derives the temporary offset value 216 based on the output signal 206.

When it is determined in the offset value at straight traveling derivation unit 58 that a vehicle is in a non-straight traveling state, the offset value at non-straight traveling derivation unit 60 sequentially derives the temporary offset value 216 based on the GPS positioning data 200, the output signal 206, the tilt angle 204, and the sensitivity coefficient 210. That is, any one of the offset value at stop derivation unit 56 to the offset value at non-straight traveling derivation unit 60 derives the traveling state information 218 in accordance with the traveling state of a vehicle, by changing the combination of the GPS positioning data 200, the output signal 206, and the like.

When it is determined that a vehicle is in a stopped state 250, the offset value at stop derivation unit 56 sequentially derives the temporary offset value 216 of the angular velocity sensor 28 based on the output signal 206. Specifically, the offset value at stop derivation unit 56 calculates the average value of the output signal 206 as the traveling state information 218, by making use of the fact that the turning angular velocity of a vehicle becomes "0" in a stopped state. When it is determined that a vehicle is in a straight traveling state 252, the offset value at straight traveling derivation unit 58 sequentially derives the temporary offset value 216 of the angular velocity sensor 28 based on the output signal 206. Specifically, also in this case the turning angular velocity of a vehicle is 0, and hence the offset value at straight traveling derivation unit 58 calculates the average value of the output signal 206 as the traveling state information 218.

When it is determined that a vehicle is in a non-straight traveling state 254, the offset value at non-straight traveling derivation unit 60 sequentially derives the temporary offset value 216, for example, during the sampling interval of a GPS direction based on the amount of GPS direction in the GPS positioning data 200, the tilt angle 204, the output signal 206, and the sensitivity coefficient 210. Herein, the temporary offset value 216 is derived as follows:

$$Goffset = 1/n * \Sigma Gout - \Delta\theta * Gsensitivity * \cos(\alpha) \quad (4)$$

wherein n is the number of samples of the output signal 206 during the sampling interval of a GPS direction, and ΣGout (mV) the total of the output signal 206 during the sampling interval of a GPS direction. Δθ (deg) is an amount of change in GPS direction, Gsensitivity (mV/deg/sec) the sensitivity coefficient 210, and α (deg) the tilt angle 204 of an angular velocity sensor. Gout corresponds to Vout in Equation (1) and Gsensitivity to S therein.

The sensitivity coefficient 210 is usually input from the non-illustrated sensitivity coefficient calculation unit 32, but the sensitivity coefficient 210 may not be calculated yet in the state immediately after the angular velocity calculation device 100 is activated, etc. In such a case, the offset value at non-straight traveling derivation unit 60 uses, as the initial value, the sensitivity coefficient 210 determined by the specification of a non-illustrated gyro device. Alternatively, the offset value at non-straight traveling derivation unit 60 may use, as the initial value, the sensitivity coefficient 210 from the sensitivity coefficient calculation unit 32, the sensitivity coefficient 210 being stored when the previous operation was completed.

The offset value filtering unit 44 inputs the temporary offset value 216 sequentially derived in the offset value for a state derivation unit 42. The offset value filtering unit 44 derives the offset value 208 of the angular velocity sensor 28 by performing statistical processing on the temporary offset value 216. The offset value 208 is indicated as Goffset, and corresponds to Voffset in Equation (1). Hereinafter, the processing in the offset value filtering unit 44 will be described with reference to FIG. 3.

Figure 3:
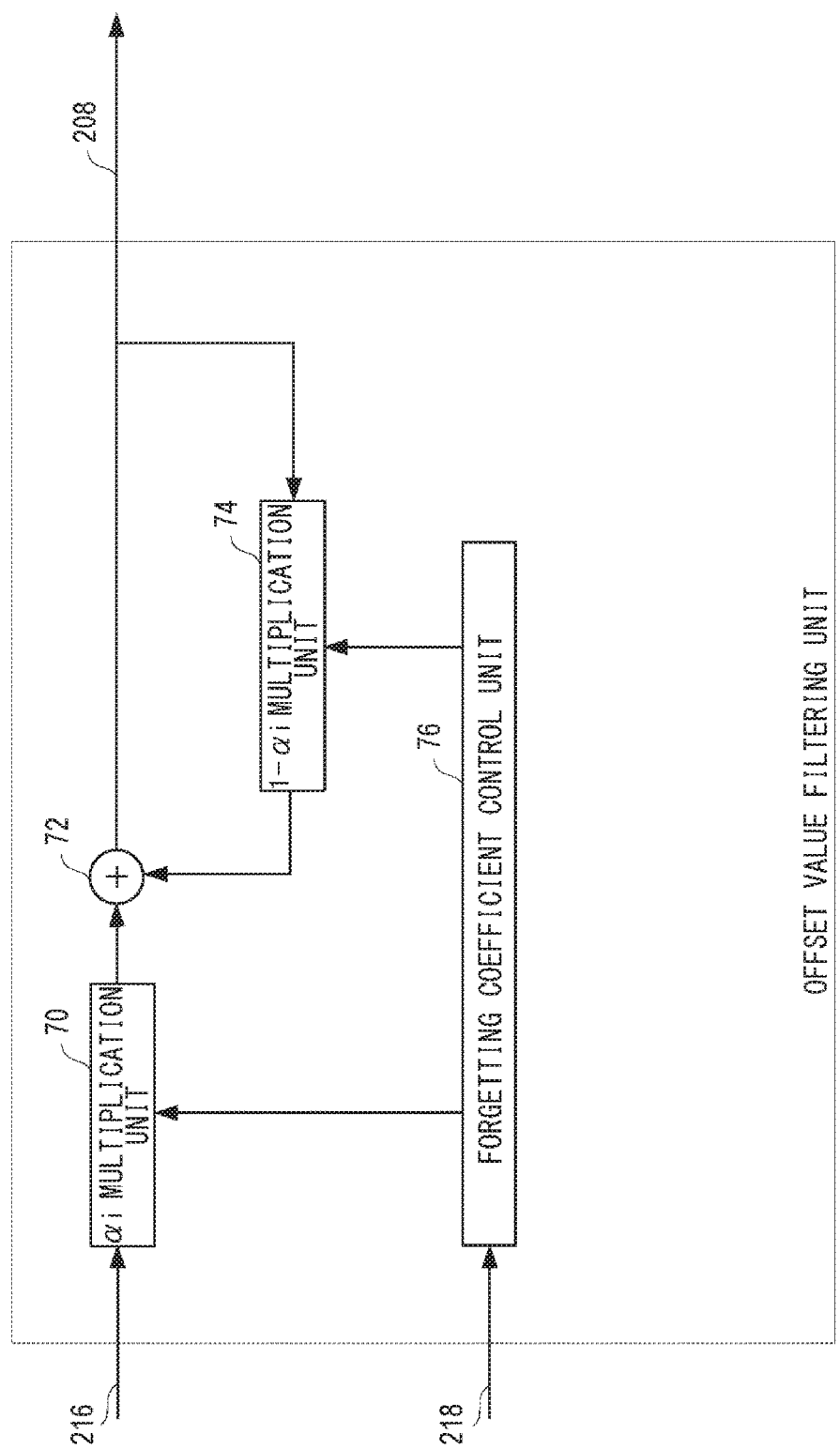
FIG. 3 is a view illustrating a configuration of an offset value filtering unit in FIG. 2.

FIG. 3 illustrates a configuration of the offset value filtering unit 44. The offset value filtering unit 44 includes an αi multiplication unit 70, an addition unit 72, a 1-αi multiplication unit 74, and a forgetting coefficient control unit 76. As illustrated, the offset value filtering unit 44 is formed to include an IIR (Infinite Impulse Response) filter that forms a low-pass filter. The αi multiplication unit 70 multiplies the temporary offset value 216 by a forgetting coefficient "αi." Wherein "i" is 1 or 2. Accordingly, the forgetting coefficient "αi" is a collective term for α1 and α2. α1 and α2 will be described later. The αi multiplication unit 70 outputs a multiplication result to the addition unit 72.

The addition unit 72 sequentially adds the multiplication result from the αi multiplication unit 70 to that from the 1−αi multiplication unit 74. The addition unit 72 sequentially outputs an addition result as the offset value 208. The 1−αi multiplication unit 74 multiplies the offset value 208 by a coefficient of "1−αi." Because "αi" in the coefficient of "1−αi" is the same as that in the αi multiplication unit 70, description thereof will be omitted herein. The 1−αi multiplication unit 74 feeds back a multiplication result to the addition unit 72. The forgetting coefficient control unit 76 inputs the traveling state information 218. The forgetting coefficient control unit 76 also determines the value of the forgetting coefficient "αi" in accordance with the state indicated by the traveling state information 218. The forgetting coefficient control unit 76 further sets the determined forgetting coefficient "αi" in the αi multiplication unit 70 and the 1−αi multiplication unit 74.

FIG. 4 illustrates a data structure of a table stored in the forgetting coefficient control unit 76. As illustrated, a traveling state column 300 and a forgetting coefficient column 302 are included. The traveling state column 300 includes each state indicated by the traveling state information 218. The forgetting coefficient column 302 stores the forgetting coefficient "αi" corresponding to the each state. That is, a forgetting coefficient "α1" is matched with a stopped state and a straight traveling state, and a forgetting coefficient "α2" is matched with a non-straight traveling state. For example, α1>α2. Refer back to FIG. 3. The forgetting coefficient control unit 76 selects the forgetting coefficient "α1" or "α2" from the state indicated by the traveling state information 218, with reference to the table of FIG. 4. Thus, the forgetting coefficient control unit 76 changes a forgetting coefficient to be used when the filtering processing is performed, in accordance with the traveling state of a vehicle.

Figure 5:
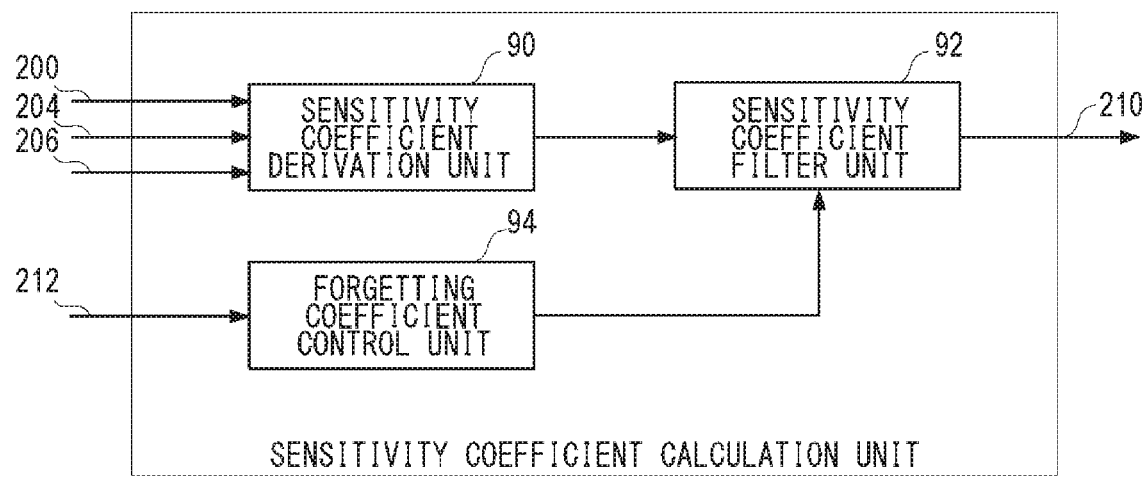
FIG. 5 is a view illustrating a configuration of a sensitivity coefficient calculation unit in FIG. 1.

FIG. 5 illustrates a configuration of the sensitivity coefficient calculation unit 32. The sensitivity coefficient calculation unit 32 includes a sensitivity coefficient derivation unit 90, a sensitivity coefficient filter unit 92, and a forgetting coefficient control unit 94. The sensitivity coefficient derivation unit 90 inputs the GPS positioning data 200, the tilt angle 204, the output signal 206, and the correlation coefficient 212. The sensitivity coefficient calculation unit 32 also inputs the offset value 208. The sensitivity coefficient derivation unit 90 sequentially derives the temporary sensitivity coefficient of the angular velocity sensor 28 based on the GPS positioning data 200, the tilt angle 204, the output signal 206, the correlation coefficient 212, and the offset value 208.

Specifically, when it is indicated in the GPS positioning data 200 that a GPS direction is valid, the sensitivity coefficient derivation unit 90 calculates the temporary sensitivity coefficient of the angular velocity sensor 28 during the sampling interval of the GPS direction, as follows:

$$G\text{sensitivity}=(1/n*\Sigma G\text{out}-G\text{offset})/\cos(\alpha)/\Delta\theta \quad (5)$$

wherein Goffset is input from the non-illustrated offset value calculation unit 30, but the offset value 208 may not be calculated yet in the state immediately after the angular velocity calculation device 100 is activated, etc. Because a division by $\Delta\theta$ is included in Equation (5), a sensitivity coefficient is calculated when $\Delta\theta$ is larger than or equal to a predetermined value. When the value of $\Delta\theta$ is smaller than or equal to the predetermined value, the sensitivity coefficient derivation unit 90 outputs the sensitivity coefficient corrected most recently.

The sensitivity coefficient filter unit 92 inputs the temporary sensitivity coefficient sequentially derived in the sensitivity coefficient derivation unit 90. The sensitivity coefficient filter unit 92 derives the sensitivity coefficient 210 of the angular velocity sensor 28 by performing statistical processing on the temporary sensitivity coefficient. The sensitivity coefficient 210 can be said to be a value for correcting the output signal 206 output from the angular velocity sensor 28. The sensitivity coefficient filter unit 92 is formed by an IIR filter, similarly to the offset value filtering unit 44 illustrated in FIG. 3, and the IIR filter forms a low-pass filter such that the forgetting coefficient of the IIR filter is set based on a command from the forgetting coefficient control unit 94.

Figure 6:
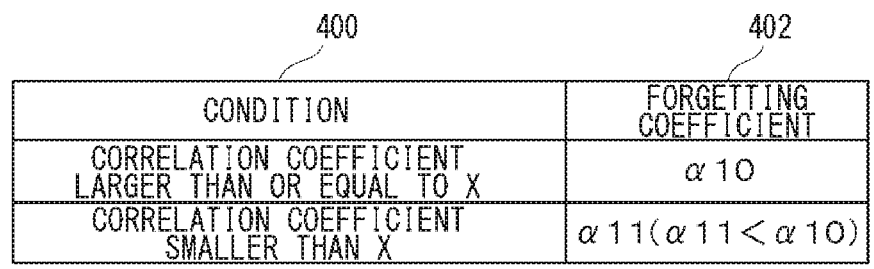
FIG. 6 is a view illustrating a data structure of a table stored in a forgetting coefficient control unit in FIG. 5.

The forgetting coefficient control unit 94 changes the forgetting coefficient of the sensitivity coefficient filter unit 92 in accordance with the correlation coefficient 212. The forgetting coefficient control unit 94 directs the sensitivity coefficient filter unit 92 to use the changed forgetting coefficient. FIG. 6 illustrates a data structure of a table stored in the forgetting coefficient control unit 94. As illustrated, a condition column 400 and a forgetting coefficient column 402 are illustrated. As the conditions of the correlation coefficient 212 for determining a forgetting coefficient, "Larger than or equal to X" and "Smaller than X" are listed in the condition column 400. The values of the forgetting coefficient corresponding to the respective conditions in the condition column 400 are listed in the forgetting coefficient column 402. Specifically, a forgetting coefficient $\alpha10$ is set for the "Larger than or equal to X", and a forgetting coefficient $\alpha11$ is specified for the "Smaller than X." The relationship of $\alpha11<\alpha10$ is further specified.

Figure 7:
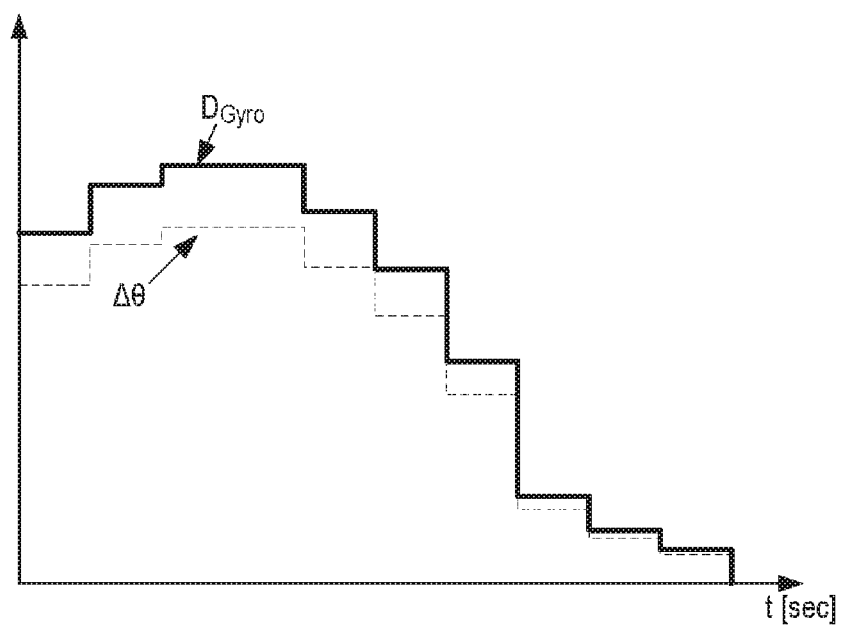
FIG. 7 is a view illustrating an outline of a correlation coefficient calculated in a correlation coefficient calculation unit in FIG. 1.

Herein, the correlation coefficient calculated by the correlation coefficient calculation unit 34 will be described with reference to FIG. 7. FIG. 7 illustrates the outline of the correlation coefficient calculated in the correlation coefficient calculation unit 34, in which graphs of both a value obtained by dividing the difference, between the output signal 206 and the offset value 208 that have been input to the correlation coefficient calculation unit 34, by the cosine value of the tilt angle 204; and the amount of change in GPS direction included in the GPS positioning data 200, are illustrated. The correlation coefficient calculation unit 34 derives D.sub.Gyro by dividing the difference between the integrated value of the output signal 206 and the offset value 208 by the cosine value of the tilt angle 204, as follows:

$$D_{gyro}=((1/n*\Sigma G_{out}))-G_{offset})/\cos(\alpha).$$

$$D_{gyro}=(1/n\cdot\Sigma G\text{out}-G\text{offset}/\cos\alpha \quad \text{[Equation 1]}$$

The right side of Equation (5), an equation for calculating a sensitivity coefficient, represents the ratio of an amount of change in the output of an angular velocity sensor to the amount of change in GPS direction, and D.sub.Gyro corresponds to an amount of change in the output of an angular velocity sensor. The correlation coefficient calculation unit 34 derives a correlation coefficient C between the amount of change D.sub.Gyro in the output of an angular velocity sensor and the amount of change in GPS direction.DELTA..theta., as follows:

$$C = \frac{\sum_{n=1}^{N}(D_{Gyro}[n]-\overline{D_{Gyro}})\times\sum_{n=1}^{N}(\Delta\theta[n]-\overline{\Delta\theta})}{\sqrt{\sum_{n=1}^{N}(D_{Gyro}[n]-\overline{D_{Gyro}})^2}\sqrt{\sum_{n=1}^{N}(\Delta\theta[n]-\overline{\Delta\theta})^2}} \quad \text{[Equation 2]}$$

The sensitivity coefficient 210 is generally affected by an influence of an individual difference or aging deterioration, but a change in the value is small in a short term. Accordingly, the fact that the correlation coefficient C is large means, in other words, that the accuracy of deriving each variable in the right side of Equation (5) is good and an error is small. That is, when the relationship between $D_{Gyro}$ and $\Delta\theta$ is high in FIG. 7, the accuracy of deriving each variable is good, and when the relationship between them is low, the accuracy of deriving each variable is decreased. The correlation coefficient calculation unit 34 outputs, as the correlation coefficient 212, the correlation coefficient C to the sensitivity coefficient calculation unit 32. As described above, when the correlation coefficient 212 is larger than or equal to X in the sensitivity coefficient filter unit 92, the accuracy of deriving the sensitivity coefficient 210 is high, and hence averaging processing is performed, in which the weighting of the newly derived temporary sensitivity coefficient is made larger than the case where the correlation coefficient 212 is smaller than X.

Figure 8:
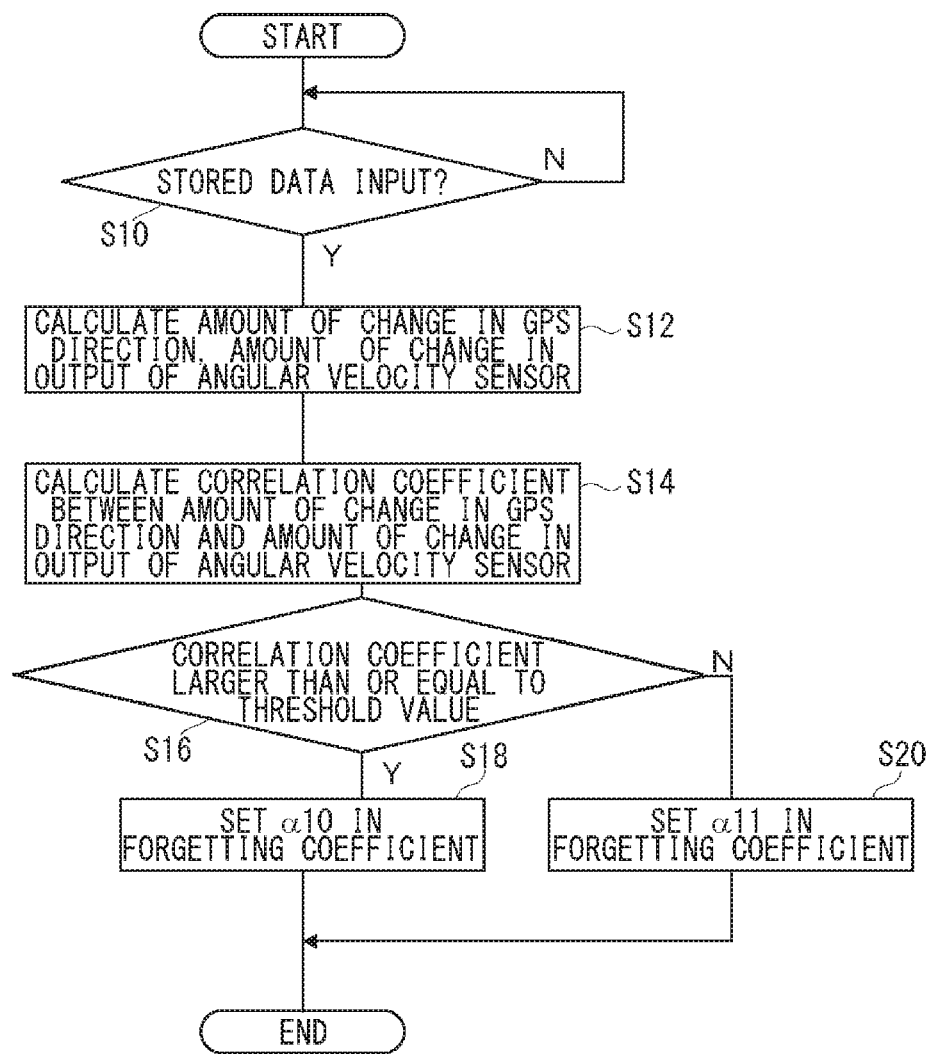
FIG. 8 is a flowchart illustrating procedures of deriving a forgetting coefficient by the angular velocity calculation device FIG. 1.

The operation of the angular velocity calculation device 100 having the above configuration will be described. FIG. 8 is a flowchart illustrating procedures of deriving a forgetting coefficient by the angular velocity calculation device 100. When the stored data 214 is input from the positioning data storage unit 36 (S10/Y), the correlation coefficient calculation unit 34 calculates an amount of change in GPS direction and an amount of change in the output of an angular velocity sensor during a predetermined period (S12). When the stored data 214 is not input from the positioning data storage unit 36 (S10/N), the correlation coefficient calculation unit 34 stands by. The correlation coefficient calculation unit 34 calculates the correlation coefficient between the amount of change in GPS direction and the amount of change in the output of an angular velocity sensor that have been calculated (S14), and outputs it to the forgetting coefficient control unit 94. When the correlation coefficient is larger than or equal to a threshold value (S16/Y), the forgetting coefficient control unit 94 sets the forgetting coefficient α10 in the sensitivity coefficient filter unit 92, and when the correlation coefficient is smaller than the threshold value (S16/N), the unit 94 sets the forgetting coefficient α11 in the sensitivity coefficient filter unit 92.

According to the present embodiment, a forgetting coefficient is changed based on a correlation coefficient, and hence a sensitivity coefficient can be derived by filtering processing suitable for the state of receiving GPS. Further, filtering processing suitable for the state of receiving GPS is achieved, and hence the accuracy of deriving a sensitivity coefficient can be improved. Furthermore, a forgetting coefficient is controlled by calculating the correlation coefficient between the amount of change in the output of an angular velocity sensor and the amount of change in GPS direction and controlled based on the correlation coefficient, and hence an influence of $\Delta\theta$ calculated from the amount of change in GPS direction or an error included in the average tilt angle α of a vehicle can be reduced, thereby allowing the accuracy of deriving a sensitivity coefficient to be improved. Still furthermore, a forgetting coefficient is set in accordance with the correlation coefficient, and hence $\Delta\theta$ calculated from the amount of change in GPS direction in Equation (5) and an error included in the average tilt angle α of a vehicle can be reduced.

Embodiment 2

Embodiment 2 will now be described. Similarly to Embodiment 1, Embodiment 2 also relates to an angular velocity calculation device in which angular velocity is derived by using an offset value and a sensitivity coefficient for an output voltage from an angular velocity sensor. In Equation (2) for deriving the offset value of an angular velocity sensor, when an amount of change in direction $\Delta\theta$ is determined from the GPS direction acquired from a GPS satellite, the accuracy of the GPS direction may be decreased depending on the state of receiving radio waves from the GPS satellite, whereby an error included in the offset value becomes large.

Also in Equation (2), when the amount of change in direction $\Delta\theta$ is determined from map data, the direction of a road based on the map data does not always and completely match the direction of travel of a vehicle, whereby an error included in the offset value may become large. Further, in Equation (2) for deriving the offset value of an angular velocity sensor, when the tilt angle of a road, included in the inclination of the detection axis of an angular velocity sensor with respect to the vertical axis, is calculated from the amount of change in GPS altitude acquired from a GPS satellite, the accuracy of the GPS direction may be decreased depending on the state of receiving radio waves from the GPS satellite, whereby an error included in the offset value becomes large.

In these cases, the error included in the offset value is required to be reduced in order to improve the accuracy of deriving angular velocity. Accordingly, when weighted averaging is performed on the previous value and the current value of the sequentially derived offset value of an angular velocity sensor, an angular velocity calculation device according to the present embodiment uses a forgetting coefficient while changing it. Specifically, the angular velocity calculation device calculates a correlation coefficient between a change in direction calculated from an angular velocity sensor and that calculated from GPS, both the changes having occurred during a predetermined period, and then changes a forgetting coefficient based on the correlation coefficient.

Figure 9:
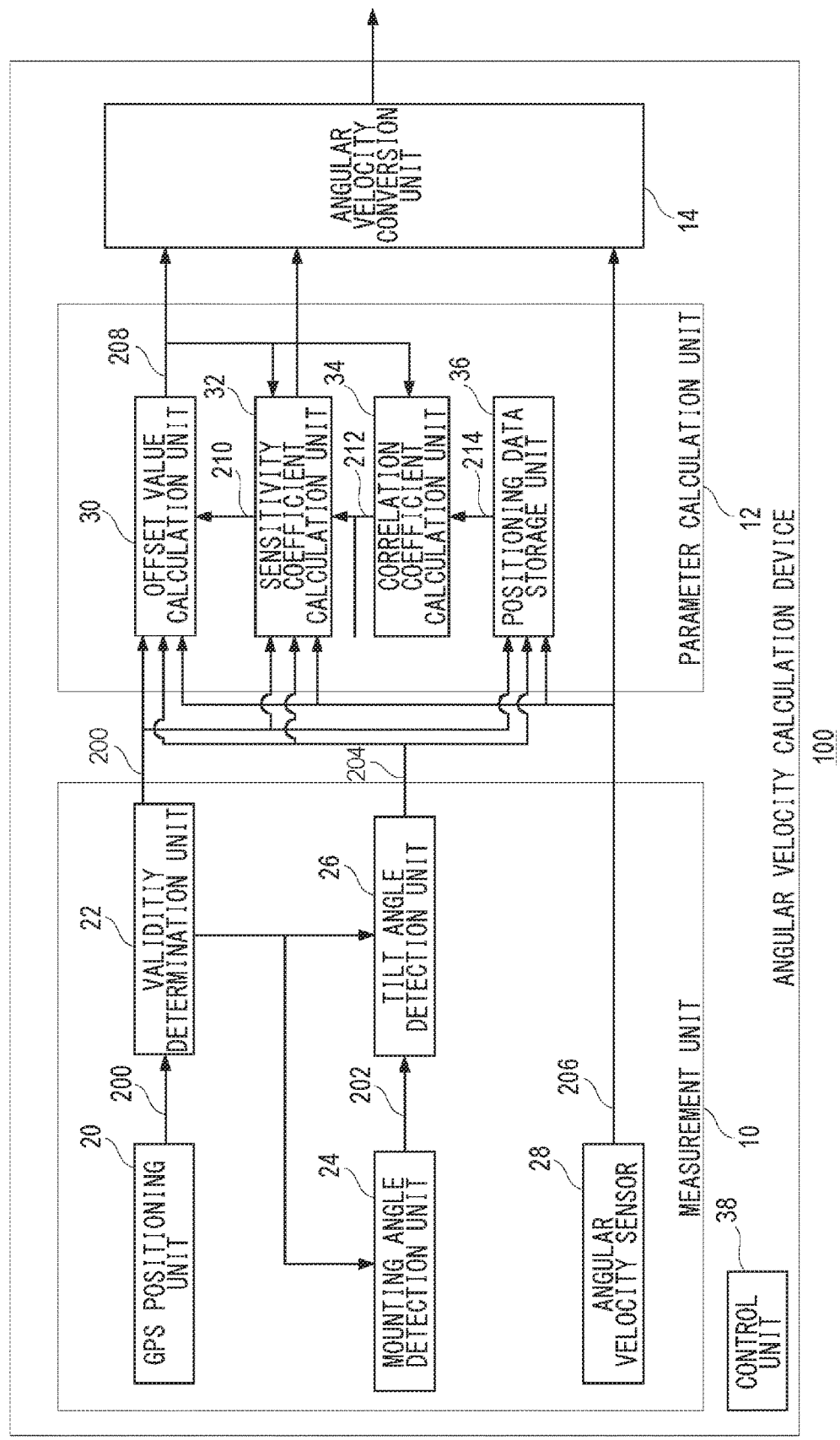
FIG. 9 is a view illustrating a configuration of an angular velocity calculation device according to Embodiment 2.

FIG. 9 illustrates a configuration of an angular velocity calculation device 100 according to Embodiment 2. The angular velocity calculation device 100 is formed by members similar to those in FIG. 1, but is different in that a correlation coefficient calculation unit 34 outputs a correlation coefficient 212 to the offset value calculation unit 30. Hereinafter, differences from the above description will be mainly described.

The offset value calculation unit 30 inputs GPS positioning data 200 from a validity determination unit 22, a tilt angle 204 from a tilt angle detection unit 26, an output signal 206 from an angular velocity sensor 28, and the correlation coefficient 212 from the correlation coefficient calculation unit 34. The offset value calculation unit 30 also inputs a sensitivity coefficient 210 from a sensitivity coefficient calculation unit 32. The offset value calculation unit 30 calculates the offset value of the angular velocity sensor 28 (hereinafter, referred to as an "offset value 208") based on the GPS positioning data 200, the tilt angle 204, the output signal 206, the sensitivity coefficient 210, and the correlation coefficient 212. The details of the processing in the offset value calculation unit 30 will be described later. The offset value calculation unit 30 outputs the offset value 208 to an angular velocity conversion unit 14, the sensitivity coefficient calculation unit 32, and the correlation coefficient calculation unit 34.

The correlation coefficient calculation unit 34 sequentially inputs the offset value 208 from the offset value calculation unit 30 and stored data 214 from a positioning data storage unit 36. When the validity flag added to the stored data 214 is valid, the correlation coefficient calculation unit 34 calculates, during a predetermined period, e.g., during a period when the sensitivity coefficient calculation unit 32 calculates the sensitivity coefficient 210, the correlation coefficient 212 between a value obtained by dividing the output signal 206 by the cosine value of the tilt angle 204 and the amount of change in GPS direction included in the GPS positioning data 200. The details of the processing in the correlation coefficient calculation unit 34 will be described later. The correlation coefficient calculation unit 34 outputs the correlation coefficient 212 to the offset value calculation unit 30 and the sensitivity coefficient calculation unit 32.

Figure 10:
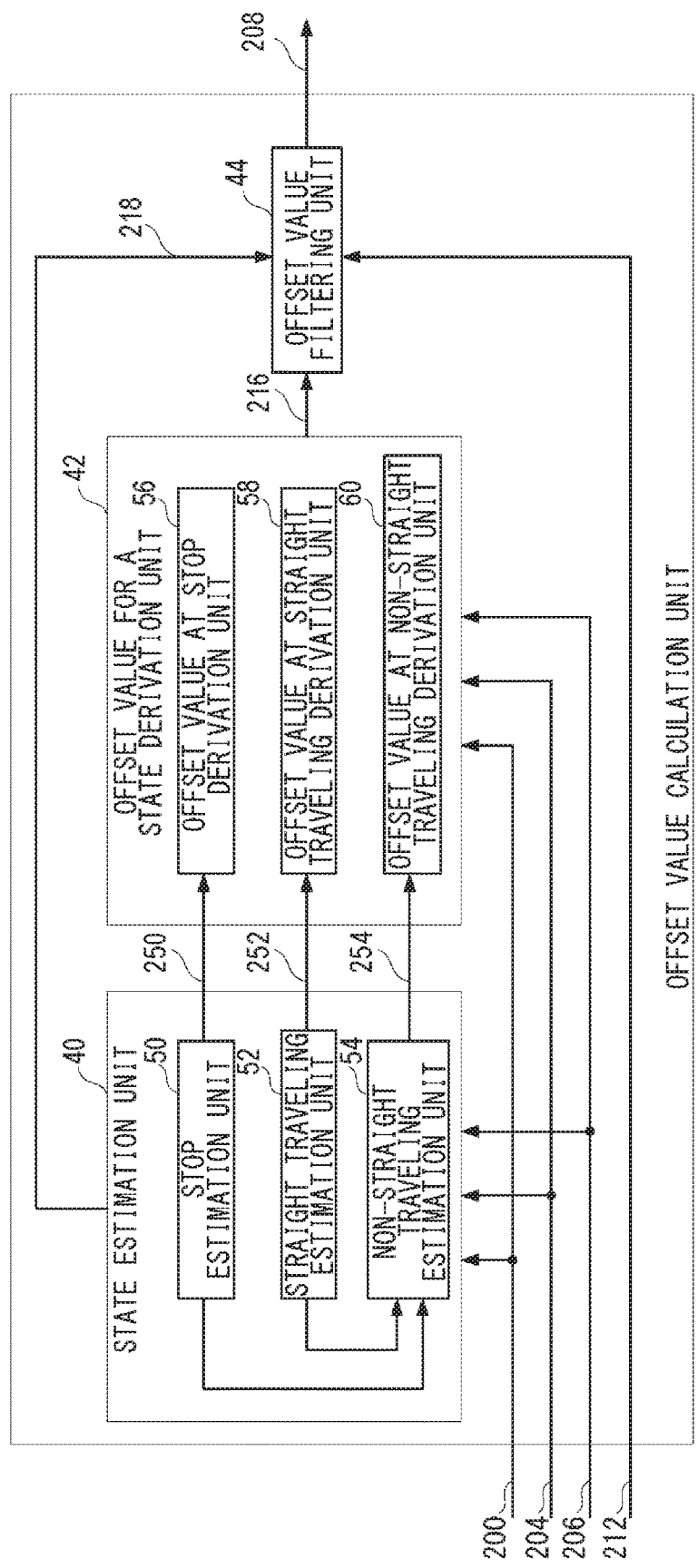
FIG. 10 is a view illustrating a configuration of an offset value calculation unit in FIG. 9.

FIG. 10 illustrates a configuration of the offset value calculation unit 30. The offset value calculation unit 30 is formed by members similar to those in FIG. 2, but different in that the correlation coefficient 212 is input to an offset value filtering unit 44. Hereinafter, differences from the above description will be mainly described. The offset value filtering unit 44 inputs a temporary offset value 216 sequentially derived in an offset value for a state derivation unit 42. The offset value filtering unit 44 derives the offset value 208 of the angular velocity sensor 28 by performing statistical processing on the temporary offset value 216. In that case, the offset value filtering unit 44 changes a forgetting coefficient to be used when the statistical processing is performed, in accordance with the correlation coefficient 212. Hereinafter, the processing in the offset value filtering unit 44 will be described with reference to FIG. 11.

Figure 11:
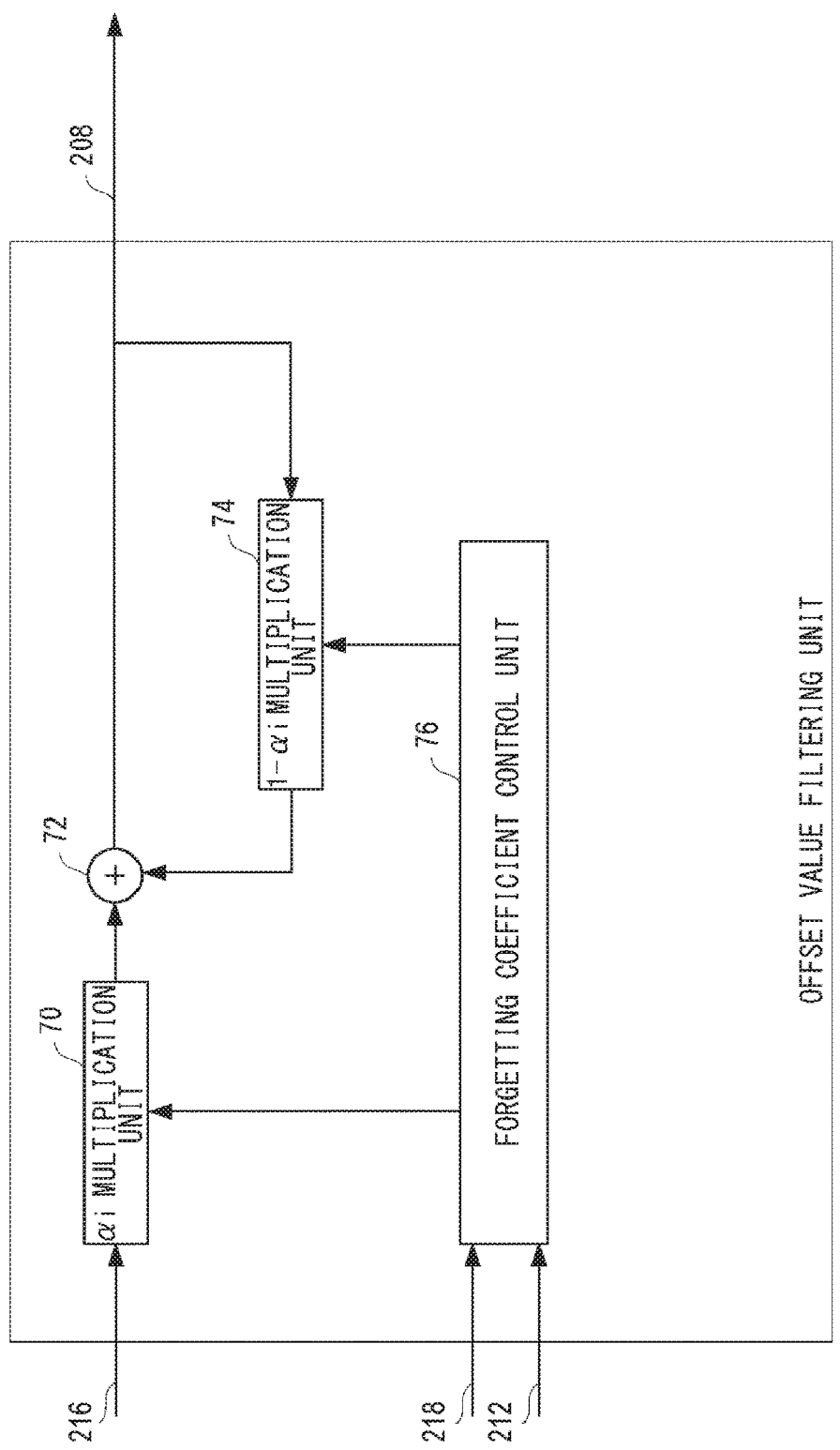
FIG. 11 is a view illustrating a configuration of an offset value filtering unit in FIG. 10.

FIG. 11 illustrates a configuration of the offset value filtering unit 44. The offset value filtering unit 44 is formed by members similar to those in FIG. 3, but different in that the correlation coefficient 212 is input to a forgetting coefficient control unit 76. Hereinafter, differences from the above description will be mainly described. The forgetting coefficient control unit 76 inputs the correlation coefficient 212 and traveling state information 218. The forgetting coefficient control unit 76 determines the value of a forgetting coefficient "αi" in accordance with the state indicated by the traveling state information 218 and the correlation coefficient 212. The forgetting coefficient control unit 76 further sets the determined forgetting coefficient "αi" in an αi multiplication unit 70 and a 1−αi multiplication unit 74.

FIG. 12 illustrates a data structure of a table stored in the forgetting coefficient control unit 76. As illustrated, a traveling state column 500, a condition column 502, and a forgetting coefficient column 504 are included. The traveling state column 500 includes each state indicated by the traveling state information 218. As the conditions of the correlation coefficient 212 for determining a forgetting coefficient, "Larger than or equal to X" and "Smaller than X" are listed in the condition column 502. The forgetting coefficient column 504 stores the forgetting coefficient "αi" corresponding to the each state. That is, the forgetting coefficient "α1" is matched to a stopped state and a straight traveling state. To a non-straight traveling state, corresponding to the condition column 502: when the correlation coefficient 212 is "Larger than or equal to X", "α21" is matched; and it is "Smaller than X", "α22" is matched. Thus, the forgetting coefficient control unit 76 selects the forgetting coefficient "α1" or "α2" from the state indicated by the traveling state information 218 with reference to the table of FIG. 12. Accordingly, the forgetting coefficient control unit 76 changes a forgetting coefficient to be used when filtering processing is performed, in accordance with the traveling state of a vehicle.

Figure 13:
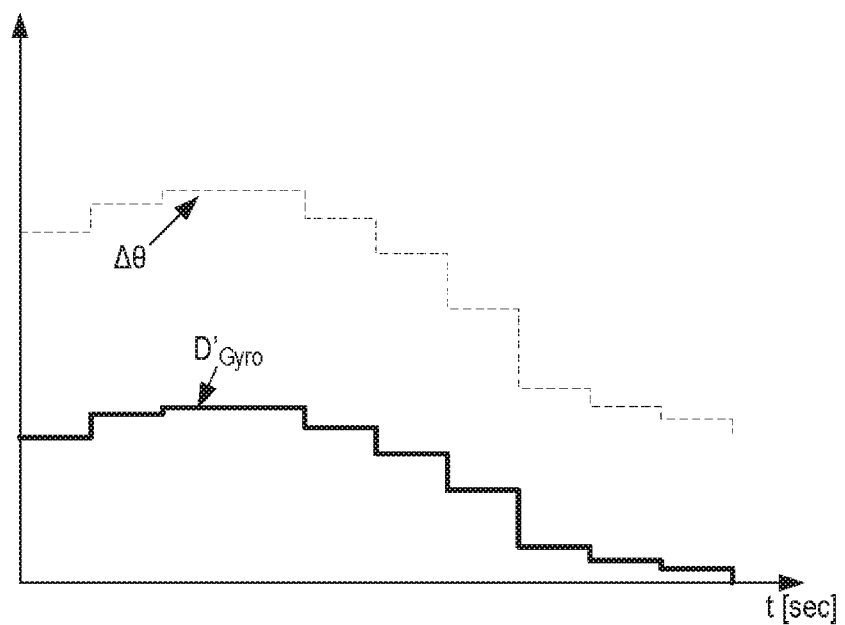
FIG. 13 is a view illustrating an outline of a correlation coefficient calculated in a correlation coefficient calculation unit in FIG. 9.

Herein, the correlation coefficient calculated by the correlation coefficient calculation unit 34 will be described with reference to FIG. 13. FIG. 13 illustrates the outline of the correlation coefficient calculated in the correlation coefficient calculation unit 34, in which graphs of both a value obtained by dividing the output signal 206 input to the correlation coefficient calculation unit 34 by the cosine value of the tilt angle 204; and the amount of change in GPS direction included in the GPS positioning data 200, are illustrated. The correlation coefficient calculation unit 34 derives D.sub.Gyro by dividing the integrated value of the output signal 206 by the cosine value of the tilt angle 204, as follows:

$$D'_{Gyro} = \frac{1/n \cdot \sum Gout}{\cos\alpha} \quad \text{[Equation 3]}$$

D'.sub.Gyro also corresponds to an amount of change in the output of an angular velocity sensor. The correlation coefficient calculation unit 34 derives the correlation coefficient C between the amount of change D'.sub.Gyro in the output of an angular velocity sensor and the amount of change in GPS direction .DELTA..theta., as follows:

$$C = \frac{\sum_{n=1}^{N} (D'_{Gyro}[n] - \overline{D'_{Gyro}}) \times \sum_{n=1}^{N} (\Delta\theta[n] - \overline{\Delta\theta})}{\sqrt{\sum_{n=1}^{N} (D'_{Gyro}[n] - \overline{D'_{Gyro}})^2} \sqrt{\sum_{n=1}^{N} (\Delta\theta[n] - \overline{\Delta\theta})^2}} \quad \text{[Equation 4]}$$

wherein the amount of change D'.sub.Gyro in the output of an angular velocity sensor is a value obtained by subtracting the term Goffset from the amount of change D.sub.Gyro in the output of an angular velocity sensor, and when Goffset is not changed during the period when the correlation coefficient C is calculated, the respective correlation coefficients with the amount of change in direction .DELTA..theta. match each other. Accordingly, when the correlation coefficient C is large, it can be said that the accuracy of each of "1/n*.SIGMA.Gout", ".DELTA..theta.", and "cos (.alpha.)" of the right side in Equation (4) is good, as described above. The correlation coefficient calculation unit 34 outputs, as the correlation coefficient 212, the correlation coefficient C to the offset value calculation unit and the sensitivity coefficient calculation unit 32. Alternatively, the correlation coefficient 212 to be output to the sensitivity coefficient calculation unit 32 may be calculated by Equation 2.

According to the present embodiment, a forgetting coefficient is changed based on a correlation coefficient, and hence an offset value can be derived by filtering processing suitable for a state of receiving GPS. Further, filtering processing suitable for a state of receiving GPS is achieved, and hence the accuracy of deriving an offset value can be improved. Furthermore, a forgetting coefficient is controlled by calculating a correlation coefficient between an amount of change in the output of an angular velocity sensor and an amount of change in GPS direction and controlled based on the correlation coefficient, and hence an influence of Δθ calculated from the amount of change in GPS direction or an error included in the average tilt angle α of a vehicle can be reduced, thereby allowing the accuracy of deriving an offset value to be improved. Still furthermore, a forgetting coefficient is set in accordance with a correlation coefficient, and hence Δθ calculated from the amount of change in GPS direction in Equation (5) and an error included in the average tilt angle α of a vehicle can be reduced.

Embodiment 3

Embodiment 3 will now be described. Embodiment 3 relates to a direction estimation device that estimates a direction by using angular velocity derived in the angular velocity calculation device described above. Even if the offset of an angular velocity sensor and a sensitivity coefficient are corrected, small errors are accumulated, and an error included in a position by self-contained navigation may become remarkable. Accordingly, when a vehicle is traveling in an area where a state of receiving GPS is bad, a combination ratio in self-contained navigation becomes large over a long period of time, and hence an error may be included in the estimated position.

In this case, when the state of receiving GPS becomes good, it is necessary that the combination ratio of the position calculated from GPS is increased such that an error included in the estimated position is corrected in a short period of time. Accordingly, in a direction estimation device according to the present embodiment, when the direction calculated from GPS and the angular velocity calculated from an angular velocity sensor are combined together, a correlation coefficient between a change in direction calculated from the angular velocity sensor and a change in direction calculated from GPS, both the changes having occurred during a predetermined period, is calculated such that a combination ratio is changed based on the correlation coefficient.

Figure 14:
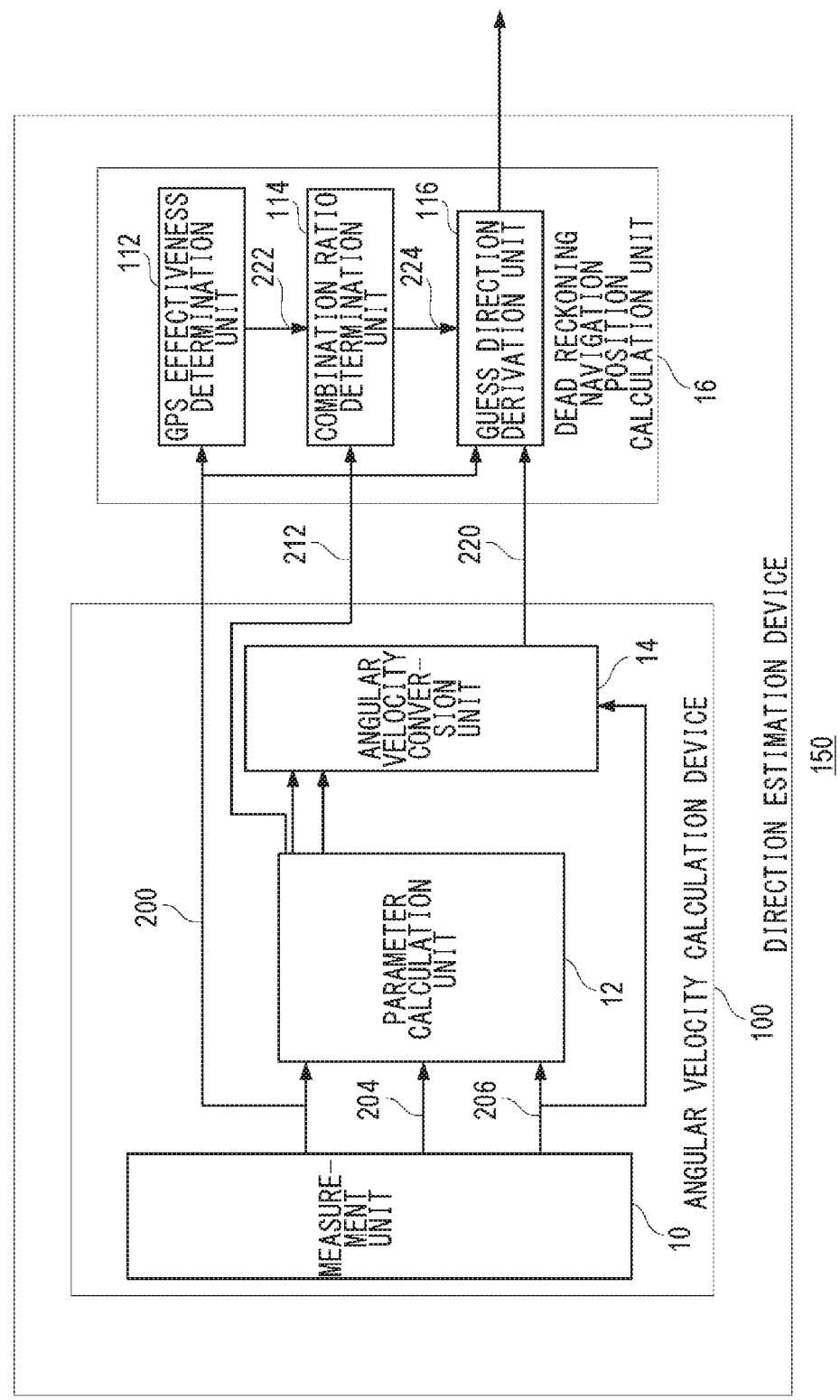
FIG. 14 is a view illustrating a configuration of a direction estimation device according to Embodiment 3.

FIG. 14 illustrates a configuration of a direction estimation device 150 according to Embodiment 3. The direction estimation device 150 includes an angular velocity calculation device 100 and a dead reckoning navigation position calculation unit 16. The dead reckoning navigation position calculation unit 16 includes a GPS effectiveness determination unit 112, a combination ratio determination unit 114, and a guess direction derivation unit 116. Signals include GPS positioning data 200, a tilt angle 204, an output signal 206, a correlation coefficient 212, angular velocity 220, GPS effectiveness 222, and a combination ratio 224. Because the angular velocity calculation device 100 is formed similarly to FIG. 1 or FIG. 9, description thereof will be omitted herein. A correlation coefficient calculation unit 34 included in a parameter calculation unit 12 also outputs the correlation coefficient 212 to the dead reckoning navigation position calculation unit 16.

The dead reckoning navigation position calculation unit 16 inputs the GPS positioning data 200, the correlation coefficient 212, and the angular velocity 220 from the angular velocity calculation device 100 to derive a dead reckoning navigation direction. The GPS effectiveness determination unit 112 inputs the GPS positioning data 200 from a measurement unit 10, and a plurality of threshold values are provided for each of an HDOP value, the number of receiving satellites, and speed, which are included in the GPS positioning data 200, so that the GPS effectiveness 222 is determined in a stepwise fashion, in accordance with each value. The threshold values provided in the GPS effectiveness determination unit 112 may or may not be the same as those provided in the validity determination unit 22.

Figure 15:
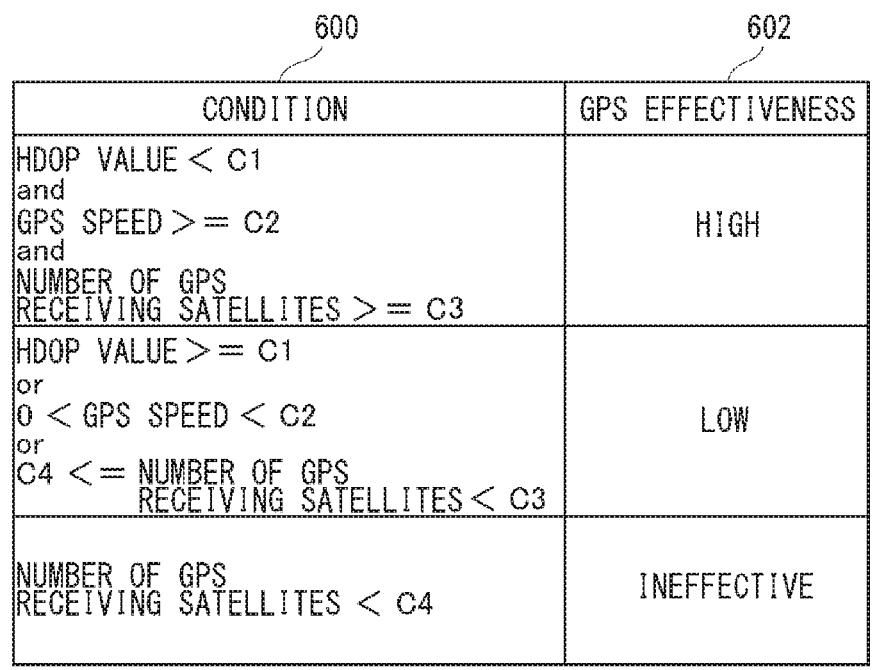
FIG. 15 is a view illustrating a data structure of a table stored in a GPS effectiveness determination unit in FIG. 14.

FIG. 15 illustrates a data structure of a table stored in the GPS effectiveness determination unit 112. The conditions of the HDOP value, GPS speed, and the number of GPS receiving satellites, the conditions being used for determining GPS effectiveness, are listed in a condition column 600. Herein, when "HDOP value is smaller than threshold value C1", "GPS speed is higher than or equal to threshold value C2", and "The number of GPS receiving satellites is larger than or equal to threshold value C3" are satisfied, it is determined that the accuracy of the GPS positioning data 200 is high, and "High" is listed in a GPS effectiveness column 602. When "HDOP value is larger than or equal to threshold value C1", "GPS speed is higher than 0 and lower than threshold value C2", or "the numbers of GPS receiving satellites is larger than or equal to threshold value C4 and smaller than threshold value C3" is satisfied, it is determined that the accuracy of the GPS positioning data 200 is low, and "Low" is listed in the GPS effectiveness column 602. Further, when "the number of GPS receiving satellites is smaller than threshold value C4" is satisfied, it is determined that the HDOP value and the GPS speed are ineffective values, and "Ineffective" is listed in the GPS effectiveness column. Refer back to FIG. 14. The GPS effectiveness determination unit 112 outputs, as the GPS effectiveness 222, a determination result to the combination ratio determination unit 114.

The combination ratio determination unit 114 inputs the correlation coefficient 212 from the parameter calculation unit 12 and the GPS effectiveness 222 from the GPS effectiveness determination unit 112, so that a ratio (hereinafter, also referred to as a "combination ratio") to be used when the amount of change in GPS direction included in the GPS positioning data 200 is combined with the angular velocity 220, is determined based on the correlation coefficient 212 and the GPS effectiveness 222. FIG. 16 illustrates a data structure of a table stored in the combination ratio determination unit 114. In the case where the GPS effectiveness 222 is "High", when the correlation coefficient 212 is larger than or equal to a threshold value C5, the combination ratio is set to be "Amount of change in GPS direction is 100% and angular velocity is 0%"; and when the correlation coefficient 212 is smaller than the threshold value C5, the combination ratio is set to be "Amount of change in GPS direction is 50% and angular velocity is 50%." In the case where the GPS effectiveness 222 is "Low", when the correlation coefficient 212 is larger than or equal to the threshold value C5, the combination ratio is set to be "Amount of change in GPS direction is 80% and angular velocity is 20%"; and when the correlation coefficient 212 is smaller than the threshold value C5, the combination ratio is set to be "Amount of change in GPS direction is 30% and angular velocity is 70%."

In the case where the GPS effectiveness 222 is "Not ineffective", when the correlation coefficient 212 is larger than or equal to the threshold value C5, the combination ratio is set to be "Amount of change in GPS direction is 60% and angular velocity is 40%"; and when the correlation coefficient 212 is smaller than the threshold value C5, the combination ratio is set to be "Amount of change in GPS direction is 20% and angular velocity is 80%." In the case where the GPS effectiveness 222 is "Ineffective", when the correlation coefficient 212 is smaller than the threshold value C5, the combination ratio is set to be "Amount of change in GPS direction is 0% and angular velocity is 100%." That is, as the GPS effectiveness 222 becomes higher, the combination ratio determination unit 114 makes the ratio of the amount of change in GPS direction higher and the ratio of the angular velocity lower. On the other hand, as the correlation coefficient 212 becomes higher, the combination ratio determination unit 114 makes the ratio of the amount of change in GPS direction higher and the ratio of the angular velocity lower. Refer back to FIG. 14. The combination ratio determination unit 114 outputs the determined combination ratio 224 to the guess direction derivation unit 116.

The guess direction derivation unit 116 inputs the GPS positioning data 200 from the measurement unit 10, the combination ratio 224 from the combination ratio determination unit 114, and the angular velocity 220 from an angular velocity conversion unit 14. The guess direction derivation unit 116 derives an amount of change in direction by combining, based on the combination ratio 224, the amount of change in GPS direction included in the GPS positioning data 200 with the temporary offset value 216. In the case where the direction toward north is represented, for example, by 0°/360°, when the amount of change in GPS direction calculated from the input GPS positioning data 200 is 10 (degree/second), the angular velocity 220 is 9 (degree/second), and the combination ratio 224 is "Amount of change in GPS direction is 80% and angular velocity is 20%"; the guess direction derivation unit 116 calculates an amount of change in direction as follows: 10×0.8+9×0.2=9.8 (degree/second). The guess direction derivation unit 116 further updates a guess direction by adding the calculated amount of change in direction to the guess direction previously derived.

When the combination ratios 224 is "Amount of change in GPS direction is 100% and angular velocity is 0%", i.e., when the combination ratio uses only an amount of change in GPS direction, the guess direction derivation unit 116 may use the direction included in the GPS positioning data 200 as the guess direction prior to the update. This corresponds to the fact that the guess direction prior to the update is replaced by the GPS direction. Even in a state where: the accuracy of GPS positioning is bad; a period of time when the combination ratio 224 is "Amount of change in GPS direction is 0% and angular velocity is 100%" lasts long; and errors in self-contained navigation are accumulated, with such a replacement, the accuracy of guess direction can be improved in a short period of time, at the time when the GPS positioning state becomes good.

According to the present embodiment, a ratio to be used when an amount of change in direction is combined with angular velocity, is adjusted based on a correlation coefficient between the amount of change in direction calculated from a GPS direction and the angular velocity calculated from an angular velocity sensor, and hence an amount of change in direction in accordance with measurement accuracy can be derived. Further, an extent, at which a dead reckoning navigation direction is corrected, is changed based on a combination ratio, and hence the period of time when a position is estimated can be shortened. Furthermore, an extent, at which a dead reckoning navigation direction is corrected, is changed based on a combination ratio, the accuracy of estimating a position can be improved. Still furthermore, when a combination ratio uses only an amount of change in GPS direction, the direction included in positioning data is used as a guess direction prior to update, and hence the accumulated errors can be reduced within a short period of time.

The present invention has been described above based on embodiments. These embodiments are illustrative in nature, and it should be appreciated by a person skilled in the art that various modifications can be made to the combinations of the components and the processing processes and such modifications also fall within the scope of the present invention.

In Embodiment 1 to Embodiment 3, the correlation coefficient calculation unit 34 fixes a calculation period when a correlation coefficient is calculated. However, without being limited thereto, the correlation coefficient calculation unit 34 may adjust a calculation period when a correlation coefficient is calculated, in accordance with, for example, an amount of change in angular velocity. Herein, the amount of change in angular velocity may be derived from the output signal 206, or be derived from the amount of change in GPS direction Δθ included in the GPS positioning data 200. Thereby, when an amount of change in angular velocity is small, a calculation period is lengthened; and when an amount of change in angular velocity is large, a calculation period is shortened. According to the present variation, a correlation coefficient in accordance with an amount of change in angular velocity can be derived.

In Embodiment 1 to Embodiment 3, the state estimation unit 40 determines a stopped state by using, for determining a traveling state of a vehicle, the GPS speed included in the GPS positioning data 200. However, without being limited thereto, the state estimation unit 40 may determine a stopped state, for example, based on a vehicle speed pulse obtained by inputting a vehicle speed pulse signal of a vehicle from a non-illustrated pulse detector. Herein, the pulse detector is connected to a non-illustrated speed sensor that is installed in the middle of a speedometer cable that rotates corresponding to the rotation of a drive shaft, the pulse detector outputting the vehicle speed pulse signal associated with the rotation of the drive shaft. According to the present variation, the speed of a vehicle can be measured by various means.

In Embodiment 1 to Embodiment 3, the validity determination unit 22 uses PDOP in order to determine the validity of the GPS positioning data 200. However, without being limited thereto, the validity determination unit 22 may use GDOP (Geometric Dilution Of Precision), HDOP (Horizontal Dilution Of Precision), or the like, or a combination thereof. According to the present variation, various parameters can be used for the determination.

In Embodiment 1 to Embodiment 3, the offset value filtering unit 44 and the sensitivity coefficient filter unit 92 are formed to include an IIR filter. However, without being limited thereto, the offset value filtering unit 44 and the sensitivity coefficient filter unit 92 may be formed to include, for example, an FIR (Finite Impulse Response) filter. In that case, a forgetting coefficient is set as a tap coefficient. According to the present variation, the flexibility of film configuration can be improved.

In Embodiment 1 to Embodiment 3, the forgetting coefficient control unit 76 specifies the same value for the forgetting coefficients for a stopped state and a straight traveling state. However, without being limited thereto, the forgetting coefficient control unit 76 may set, for example, different values for them. This can be said that different processing is performed for each of the three states. According to the present variation, three forgetting coefficients are provided for the three traveling states, and hence filtering processing suitable for each state can be performed.

What is claimed is:

1. An automobile navigation system for estimating a position of an automobile, comprising:
   a Global Positioning Satellite (GPS) positioning unit comprising a GPS receiver and a transceiver that receives a signal from a GPS satellite to calculate GPS positioning data, wherein the GPS positioning unit outputs the GPS positioning data to an angular velocity sensor correction device;

the angular velocity sensor correction device comprising a computer including a memory and microprocessor, the memory storing software including executable instructions that, in response to execution, cause the microprocessor to perform operations including:

an acquisition unit that acquires both the GPS positioning data of an object positioned from the GPS positioning unit based on the signal from the GPS satellite and angular velocity of the object output from an angular velocity sensor, wherein the object includes a body of an automobile;

a sensitivity coefficient derivation unit that sequentially derives a temporary sensitivity coefficient of the angular velocity sensor based on the GPS positioning data and the angular velocity that have been acquired in the acquisition unit;

a sensitivity coefficient filtering unit that derives a sensitivity coefficient of the angular velocity sensor for correcting angular velocity output from the angular velocity sensor, by processing the temporary sensitivity coefficient of the angular velocity sensor sequentially derived in the sensitivity coefficient derivation unit;

a correlation coefficient derivation unit that derives a correlation coefficient that indicates a correlation between an amount of change in a GPS direction and an amount of change in an output of the angular velocity sensor, wherein:

the sensitivity coefficient filtering unit changes a forgetting coefficient to be used when the processing is performed, in accordance with the correlation coefficient derived in the correlation coefficient derivation unit, wherein in the correlation a magnitude of an error is determined by referring to the derived correlation coefficient, wherein if the magnitude of error is large, the correlation coefficient will be small so that a forgetting coefficient that will increase an influence of a previous offset value is set, and wherein if the magnitude of error is small, the correlation coefficient will be large so that a forgetting coefficient that will increase an influence of a current offset value is set, and the correlation coefficient derivation unit adjusts a calculation period each time a correlation coefficient is calculated, in accordance with an amount of change in angular velocity;

a dead reckoning navigation position calculation unit that inputs the GPS positioning data, the correlation coefficient, and the angular velocity to derive and output a dead reckoning navigation direction; and a display to display the dead reckoning navigation direction received from the dead reckoning navigation position calculation unit.

2. An automobile navigation system for estimating a position of an automobile, comprising:

a Global Positioning Satellite (GPS) positioning unit comprising a GPS receiver and a transceiver that receives a signal from a GPS satellite to calculate GPS positioning data, wherein the GPS positioning unit outputs the GPS positioning data to an angular velocity sensor correction device;

the angular velocity sensor correction device comprising a computer including a memory and microprocessor, the memory storing software including executable instructions that, in response to execution, cause the microprocessor to perform operations including:

an offset value derivation unit that sequentially derives a temporary offset value of the angular velocity sensor based on the GPS positioning data of an object position from the GPS positioning unit based on the signal from the GPS satellite and the angular velocity of the object output from an angular velocity sensor that have been acquired in the acquisition unit, wherein the object includes a body of an automobile;

an offset value filtering unit that derives an offset value of the angular velocity sensor for correcting the angular velocity output from the angular velocity sensor, by processing the temporary offset value of the angular velocity sensor sequentially derived in the offset value derivation unit; and a correlation coefficient derivation unit that derives a correlation coefficient that indicates a correlation between an amount of change in a GPS direction and an amount of change in an output of the angular velocity sensor, wherein:

the offset value filtering unit changes a forgetting coefficient to be used when the processing is performed, in accordance with the correlation coefficient derived in the correlation coefficient derivation unit, wherein in the correlation a magnitude of an error is determined by referring to the derived correlation coefficient, wherein if the magnitude of error is large, the correlation coefficient will be small so that a forgetting coefficient that will increase an influence of a previous offset value is set, and wherein if the magnitude of error is small, the correlation coefficient will be large so that a forgetting coefficient that will increase an influence of a current offset value is set, and the correlation coefficient derivation unit adjusts a calculation period each time a correlation coefficient is calculated, in accordance with an amount of change in angular velocity.

3. The automobile navigation system of claim 1, wherein the correlation coefficient derivation unit calculates a correlation coefficient based on: a value obtained by dividing at least an integrated value of angular velocity by a cosine value of a tilt angle of the angular velocity sensor; and an amount of change in direction angle included in the GPS positioning data.

4. The automobile navigation system of claim 2, wherein the correlation coefficient derivation unit calculates a correlation coefficient based on: a value obtained by dividing at least an integrated value of angular velocity by a cosine value of a tilt angle of the angular velocity sensor; and an amount of change in direction angle included in the GPS positioning data.

5. A computer implemented angular velocity sensor correction method for estimating a position of an automobile by an automobile navigation system, comprising:

receiving, by a Global Positioning Satellite (GPS) positioning unit comprising a GPS receiver and a transceiver, a signal from a GPS satellite to calculate GPS positioning data;

outputting, by a Global Positioning Satellite (GPS) positioning unit, the GPS positioning data to an angular velocity sensor correction device;

acquiring, by the angular velocity sensor correction device comprising a computer including a memory and microprocessor, both the GPS positioning data of an object position from the GPS positioning unit based on the signal from the GPS satellite and angular velocity of the object output from an angular velocity sensor, wherein the object includes a body of an automobile;

sequentially deriving, by the angular velocity sensor correction device, a temporary sensitivity coefficient of the angular velocity sensor based on the GPS positioning data and the angular velocity that have been acquired;

deriving, by the angular velocity sensor correction device, a sensitivity coefficient of the angular velocity sensor for correcting the angular velocity output from the angular velocity sensor, by processing the temporary sensitivity coefficient of the angular velocity sensor that has been sequentially derived; and deriving, by the angular velocity sensor correction device, a correlation coefficient that indicates a correlation between an amount of change in a GPS direction and an amount of change in an output of the angular velocity sensor, wherein the deriving a sensitivity coefficient of the angular velocity sensor changes a forgetting coefficient to be used when the processing is performed, in accordance with the derived correlation coefficient, and wherein in the correlation a magnitude of an error is determined by referring to the derived correlation coefficient, wherein if the magnitude of error is large, the correlation coefficient will be small so that a forgetting coefficient that will increase an influence of a previous offset value is set, and wherein if the magnitude of error is small, the correlation coefficient will be large so that a forgetting coefficient that will increase an influence of a current offset value is set.

6. A computer implemented angular velocity sensor correction method for estimating a position of an automobile by an automobile navigation system, comprising:

receiving, by a Global Positioning Satellite (GPS) positioning unit comprising a GPS receiver and a transceiver, a signal from a GPS satellite to calculate GPS positioning data;

outputting, by the GPS positioning unit, the GPS positioning data to an angular velocity sensor correction device;

acquiring, by the angular velocity sensor correction device comprising a computer including a memory and microprocessor, both the GPS positioning data of an object positioned from the GPS positioning unit based on the signal from the GPS satellite and angular velocity of the object output from an angular velocity sensor, wherein the object includes a body of an automobile;

sequentially deriving, by the angular velocity sensor correction device, a temporary offset value of the angular velocity sensor based on the GPS positioning data and the angular velocity that have been acquired;

deriving, by the angular velocity sensor correction device, an offset value of the angular velocity sensor for correcting the angular velocity output from the angular velocity sensor, by processing the temporary offset value of the angular velocity sensor that has been sequentially derived; and deriving, by the angular velocity sensor correction device, a correlation coefficient that indicates a correlation between an amount of change in a GPS direction and an amount of change in an output of the angular velocity sensor, wherein the deriving an offset value of the angular velocity sensor changes a forgetting coefficient to be used when the processing is performed, in accordance with the derived correlation coefficient, and wherein in the correlation a magnitude of an error is determined by referring to the derived correlation coefficient, wherein if the magnitude of error is large, the correlation coefficient will be small so that a forgetting coefficient that will increase an influence of a previous offset value is set, and wherein if the magnitude of error is small, the correlation coefficient will be large so that a forgetting coefficient that will increase an influence of a current offset value is set.

7. An automobile navigation system for estimating a position of an automobile, comprising:

a Global Positioning Satellite (GPS) positioning unit comprising a GPS receiver and a transceiver that receives a signal from a GPS satellite to calculate GPS positioning data, wherein the GPS positioning unit outputs the GPS positioning data to a direction estimation device;

the direction estimation device comprising a computer including a memory and microprocessor, the memory storing software including executable instructions that, in response to execution, cause the microprocessor to perform operations including: an acquisition unit that acquires both the GPS positioning data of an object positioned from the GPS positioning unit based on the signal from the GPS satellite and angular velocity of the object output from an angular velocity sensor, wherein the object includes a body of an automobile;

a sensitivity coefficient calculation unit that derives a sensitivity coefficient of the angular velocity sensor, based on the GPS positioning data and the angular velocity that have been acquired in the acquisition unit;

an offset value calculation unit that derives an offset value of the angular velocity sensor, based on the GPS positioning data and the angular velocity that have been acquired in the acquisition unit;

an angular velocity conversion unit that corrects the angular velocity acquired in the acquisition unit, based on: the offset value of the angular velocity sensor derived in the offset value calculation unit; and the sensitivity coefficient of the angular velocity sensor derived in the sensitivity coefficient calculation unit;

a correlation coefficient derivation unit that derives a correlation coefficient that indicates a correlation between an amount of change in a GPS direction and an amount of change in an output of the angular velocity sensor, wherein in the correlation a magnitude of an error is determined by referring to the derived correlation coefficient, wherein if the magnitude of error is large, the correlation coefficient will be small so that a forgetting coefficient that will increase an influence of a previous offset value is set, and wherein if the magnitude of error is small, the correlation coefficient will be large so that a forgetting coefficient that will increase an influence of a current offset value is set, a determination unit that determines a ratio to be used when an amount of change in direction angle included in the GPS positioning data acquired in the acquisition unit is combined with the angular velocity corrected in the angular velocity conversion unit, based on: the correlation coefficient derived in the correlation coefficient derivation unit and effectiveness of the GPS positioning data acquired in the acquisition unit; and an updating unit that combines, at the ratio determined in the determination unit, the amount of change in direction angle included in the GPS positioning data acquired in the acquisition unit with the angular velocity corrected in the angular velocity conversion unit to update a direction by a combined value.

8. The automobile navigation system of claim 7, wherein as effectiveness of the GPS positioning data acquired in the acquisition unit becomes higher, the determination unit makes: a ratio of the amount of change in direction angle included in the GPS positioning data acquired in the acquisition unit higher; and a ratio of the angular velocity corrected in the angular velocity conversion unit lower.

9. The automobile navigation system of claim 7, wherein as the correlation coefficient derived in the correlation coefficient derivation unit becomes higher, the determination unit makes: a ratio of the amount of change in direction angle included in the GPS positioning data acquired in the acquisition unit higher; and a ratio of the angular velocity corrected in the angular velocity conversion unit lower.

10. The automobile navigation system of claim 7, wherein when it is shown that the ratio determined in the determination unit uses only the amount of change in direction angle included in the GPS positioning data acquired in the acquisition unit, the updating unit uses, as a direction prior to update, the direction included in the GPS positioning data acquired in the acquisition unit.

11. A computer implemented direction estimation method for estimating a position of an automobile by an automobile navigation system, comprising:
  receiving, by a Global Positioning Satellite (GPS) positioning unit comprising a GPS receiver and a transceiver, a signal from a GPS satellite to calculate GPS positioning data;
  outputting, by the GPS positioning unit, the GPS positioning data to a direction estimation device;
  acquiring, by the direction estimation device comprising a computer including a memory and microprocessor, both the GPS positioning data of an object position from the GPS positioning unit based on the signal from the GPS satellite and angular velocity of the object output from an angular velocity sensor, wherein the object includes a body of an automobile;
  deriving, by the direction estimation device, a sensitivity coefficient of the angular velocity sensor based on the GPS positioning data and the angular velocity that have been acquired;
  deriving, by the direction estimation device, an offset value of the angular velocity sensor based on the GPS positioning data and the angular velocity that have been acquired;
  correcting, by the direction estimation device, the acquired angular velocity based on the derived offset value of the angular velocity sensor and the derived sensitivity coefficient of the angular velocity sensor;
  deriving, by the direction estimation device, a correlation coefficient that indicates a correlation between an amount of change in a GPS direction and an amount of change in an output of the angular velocity sensor,
    wherein in the correlation a magnitude of an error is determined by referring to the derived correlation coefficient, wherein if the magnitude of error is large, the correlation coefficient will be small so that a forgetting coefficient that will increase an influence of a previous offset value is set, and wherein if the magnitude of error is small, the correlation coefficient will be large so that a forgetting coefficient that will increase an influence of a current offset value is set;
  determining, by the direction estimation device, a ratio to be used when the amount of change in direction angle included in the acquired GPS positioning data is combined with the corrected angular velocity, based on the derived correlation coefficient and effectiveness of the acquired GPS positioning data; and
  combining, by the direction estimation device, at the determined ratio, the amount of change in direction angle included in the acquired GPS positioning data with the corrected angular velocity to update a direction by a combined value.

* * * * *